United States Patent
Sung et al.

(10) Patent No.: US 11,545,162 B2
(45) Date of Patent: Jan. 3, 2023

(54) AUDIO RECONSTRUCTION METHOD AND DEVICE WHICH USE MACHINE LEARNING

(71) Applicant: Samsung Electronics Co., Ltd., Suwon-si (KR)

(72) Inventors: Ho-sang Sung, Seoul (KR); Jong-hoon Jeong, Hwaseong-si (KR); Ki-hyun Choo, Seoul (KR); Eun-mi Oh, Seoul (KR); Jong-youb Ryu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 16/652,759

(22) PCT Filed: Oct. 24, 2017

(86) PCT No.: PCT/KR2017/011786
§ 371 (c)(1),
(2) Date: Apr. 1, 2020

(87) PCT Pub. No.: WO2019/083055
PCT Pub. Date: May 2, 2019

(65) Prior Publication Data
US 2020/0234720 A1 Jul. 23, 2020

(51) Int. Cl.
*G10L 19/02* (2013.01)
*G06N 20/00* (2019.01)
(Continued)

(52) U.S. Cl.
CPC .............. *G10L 19/02* (2013.01); *G06F 3/162* (2013.01); *G06K 9/6227* (2013.01); *G06N 3/08* (2013.01); *G06N 20/00* (2019.01); *G10L 19/0017* (2013.01)

(58) Field of Classification Search
CPC ... G10L 19/0017; G10L 19/02; G10L 21/038; G10L 19/04; G10L 25/30; G06F 3/152; G06N 20/00; G06N 3/08
(Continued)

(56) References Cited

U.S. PATENT DOCUMENTS 9,135,920 B2   9/2015  Soulodre
9,311,923 B2   4/2016  Radhakrishnan et al.
(Continued)

FOREIGN PATENT DOCUMENTS

CN      104751849 A     7/2015
KR   10-2004-0047361 A  6/2004
(Continued)

OTHER PUBLICATIONS

Volodymyr Kuleshov et al., Audio Super-Resolution Using Neural Nets, The 5th International Conference on Learning Representations (ICLR 2017), Workshop Track, Aug. 2, 2017, Depailinent of Computer Science, Stanford University.
(Continued)

*Primary Examiner* — Melur Ramakrishnaiah
(74) *Attorney, Agent, or Firm* — Jefferson IP Law, LLP

(57) ABSTRACT

Provided are an audio reconstruction method and device for providing improved sound quality by reconstructing a decoding parameter or an audio signal obtained from a bitstream, by using machine learning. The audio reconstruction method includes obtaining a plurality of decoding parameters of a current frame by decoding a bitstream, determining characteristics of a second parameter included in the plurality of decoding parameters and associated with a first parameter, based on the first parameter included in the plurality of decoding parameters, obtaining a reconstructed second parameter by applying a machine learning model to at least one of the plurality of decoding parameters, the second parameter, and the characteristics of the second parameter, and decoding an audio signal, based on the reconstructed second parameter.

16 Claims, 15 Drawing Sheets

(51) Int. Cl.
*G06K 9/62* (2022.01)
*G06N 3/08* (2006.01)
*G10L 19/00* (2013.01)
*G06F 3/16* (2006.01)

(58) Field of Classification Search
USPC .............................................. 700/94; 704/200
See application file for complete search history.

(56) References Cited

U.S. PATENT DOCUMENTS

| | | | |
|---|---|---|---|
| 9,640,194 | B1 | 5/2017 | Nemala et al. |
| 10,121,484 | B2 | 11/2018 | Liu et al. |
| 10,609,520 | B2 | 3/2020 | Lee et al. |
| 2004/0107090 | A1 | 6/2004 | Oh et al. |
| 2013/0144614 | A1 | 6/2013 | Myllyla et al. |
| 2015/0269953 | A1 | 9/2015 | Siami |

FOREIGN PATENT DOCUMENTS

| | | | | |
|---|---|---|---|---|
| KR | 10-0446594 B1 | | 8/2004 | |
| KR | 10-1597579 B1 | | 2/2016 | |
| WO | WO-2011148230 A1 | * | 12/2011 | ......... G10L 19/0208 |
| WO | 2016/040885 A1 | | 3/2016 | |

OTHER PUBLICATIONS

International Search Report dated Jul. 24, 2018, issued in International Patent Application No. PCT/KR2017/011786.
Kehuang Li et al., DNN-Based Speech Bandwidth Expansion and Its Application to Adding High-Frequency Missing Features for Automatic Speech Recognition of Narrowband Speech, INTERSPEECH 2015, Sep. 6, 2015, sections 2, and 4, figures 1,2, XP055716537.
Kehuang Li et al., A Deep Neural Network Approach To Speech Bandwidth Expansion, 2015 IEEE International Conference on Acoustics, Speech and Signal Processing (ICASSP), Aug. 4, 2015, pp. 4395-4399, figures 1-3, XP033187591.
Jianqing Gao et al., An Experimental Study on Joint Modeling of Mixed-Bandwidth Data via Deep Neural Networks for Robust Speech Recognition, 2016 International Joint Conference on Neural Networks (IJCNN), IEEE, Oct. 31, 2016, pp. 588-594, figures 1, 2, XP032992219.
European Search Report dated Aug. 3, 2020, issued in European Patent Application No. 17929628.0.
Indian Office Action dated Mar. 30, 2022, issued in Indian Patent Application No. 202017015709.
ISO/IEC JTC 1/SC 29/WG 11 N9500, ISO/IEC 14496-3, MPEG-4 Audio Fourth Edition, Subpart 4: General Audio Coding (GA)—AAC, TwinVQ, BSAC, May 15, 2009.
Korean Office Action dated Sep. 2, 2022, issued in Korean Patent Application No. 10-2020-7006359.

* cited by examiner

AUDIO RECONSTRUCTION METHOD AND DEVICE WHICH USE MACHINE LEARNING

TECHNICAL FIELD

The disclosure relates to an audio reconstruction method and device, and more particularly, to an audio reconstruction method and device for providing improved sound quality by reconstructing decoding parameters or an audio signal obtained from a bitstream, by using machine learning.

BACKGROUND ART

Audio codec technology capable of transmitting, reproducing, and storing high-quality audio contents has been developed, and current ultra-high sound quality technology enables transmission, reproduction, and storing of audio having a 24-bit/192 kHz resolution. The 24-bit/192 kHz resolution means that original audio is sampled at 192 kHz and a sampled signal may be represented in $2^{24}$ states by using 24 bits.

However, high-bandwidth data transmission may be required to transmit high-quality audio contents. In addition, high-quality audio contents have high service prices and require high-quality audio codecs and thus may cause royalty problems. Furthermore, because high-quality audio services have recently begun to be provided, audio recorded with high quality may not be present. Therefore, the necessity of a technology for reconstructing low-quality audio to high quality is increasing. To reconstruct low-quality audio to high quality, artificial intelligence (AI) may be used.

AI systems are computer systems capable of implementing human-level intelligence, and refer to systems in which a machine autonomously learns, determines, and becomes smarter unlike existing rule-based smart systems. A recognition rate may be increased and user preferences may be understood more accurately in proportion to iterations of the AI systems, and thus the existing rule-based smart systems are being gradually replaced by the AI systems based on deep learning.

AI technology includes machine learning (or deep learning) and element technologies using machine learning. The machine learning refers to an algorithm technology for autonomously classifying/learning features of input data, and the element technologies refer to technologies for mimicking functions of human brains, e.g., recognition and determination, by using the machine learning algorithm such as deep learning and includes fields of technologies such as linguistic understanding, visual understanding, inference/prediction, knowledge representation, and operation control.

Examples of various fields to which the AI technology is applicable are as described below. Linguistic understanding refers to a technology for recognizing and applying/processing languages/characters of humans and includes natural language processing, machine translation, dialog systems, queries and responses, voice recognition/synthesis, etc. Visual understanding refers to a technology for recognizing and processing an object like human vision and includes object recognition, object tracking, image search, human recognition, scene understanding, space understanding, image enhancement, etc. Inference/prediction refers to a technology for determining information and logically performing inference and prediction and includes knowledge/probability-based inference, optimization prediction, preference-based planning, recommendation, etc. Knowledge representation refers to a technology for automatically processing human experience information to knowledge data and includes knowledge construction (data generation/classification), knowledge management (data utilization), etc. Operation control refers to a technology for controlling autonomous driving of vehicles and motion of robots and includes motion control (e.g., navigation, collision avoidance, and driving control), manipulation control (e.g., action control), etc.

According to the disclosure, reconstructed decoding parameters are obtained by performing machine learning by using original audio and various decoding parameters of an audio codec. According to the disclosure, higher-quality audio may be reconstructed using the reconstructed decoding parameters.

DESCRIPTION OF EMBODIMENTS

Solution to Problem

Provided is a method and device for reconstructing decoding parameters or an audio signal obtained from a bitstream, by using machine learning.

According to an aspect of the present disclosure, an audio reconstruction method includes obtaining a plurality of decoding parameters of a current frame by decoding a bitstream, determining characteristics of a second parameter included in the plurality of decoding parameters and associated with a first parameter, based on the first parameter included in the plurality of decoding parameters, obtaining a reconstructed second parameter by applying a machine learning model to at least one of the plurality of decoding parameters, the second parameter, and the characteristics of the second parameter, and decoding an audio signal, based on the reconstructed second parameter.

The decoding of the audio signal may include obtaining a corrected second parameter by correcting the reconstructed second parameter, based on the characteristics of the second parameter, and decoding the audio signal, based on the corrected second parameter.

The determining of the characteristics of the second parameter may include determining a range of the second parameter, based on the first parameter, and wherein the obtaining of the corrected second parameter includes obtaining a value of the range, which is closest to the reconstructed second parameter, as the corrected second parameter when the reconstructed second parameter is not within the range.

The determining of the characteristics of the second parameter may include determining the characteristics of the second parameter by using a machine learning model pre-trained based on at least one of the first and second parameters.

The obtaining of the reconstructed second parameter may include determining candidates of the second parameter based on the characteristics of the second parameter, and selecting one of the candidates of the second parameter, based on the machine learning model.

The obtaining of the reconstructed second parameter may include obtaining the reconstructed second parameter of the current frame, further based on at least one of a plurality of decoding parameters of a previous frame.

The machine learning model may be generated by machine-learning an original audio signal and at least one of the plurality of decoding parameters.

According to another aspect of the present disclosure, an audio reconstruction method includes obtaining a plurality of decoding parameters of a current frame by decoding a bitstream, decoding an audio signal, based on the plurality of decoding parameters, selecting a machine learning model from among a plurality of machine learning models, based on the decoded audio signal and at least one of the plurality of decoding parameters, and reconstructing the decoded audio signal by using the selected machine learning model.

The machine learning model may be generated by machine-learning the decoded audio signal and an original audio signal.

The selecting of the machine learning model may include determining a start frequency of a bandwidth extension, based on at least one of the plurality of decoding parameters, and selecting a machine learning model of the decoded audio signal, based on the start frequency and a frequency of the decoded audio signal.

The selecting of the machine learning model may include obtaining a gain of a current frame, based on at least one of the plurality of decoding parameters, obtaining an average of gains of the current frame and frames adjacent to the current frame, selecting a machine learning model for a transient signal when a difference between the gain of the current frame and the average of the gains is greater than a threshold, determining whether a window type included in the plurality of decoding parameters indicates short, when the difference between the gain of the current frame and the average of the gains is less than the threshold, selecting the machine learning model for the transient signal when the window type indicates short, and selecting a machine learning model for a stationary signal when the window type does not indicate short.

According to another aspect of the present disclosure, an audio reconstruction device includes a memory storing a received bitstream, and at least one processor configured to obtain a plurality of decoding parameters of a current frame by decoding the bitstream, determine characteristics of a second parameter included in the plurality of decoding parameters and associated with a first parameter, based on the first parameter included in the plurality of decoding parameters, obtain a reconstructed second parameter by applying a machine learning model to at least one of the plurality of decoding parameters, the second parameter, and the characteristics of the second parameter, and decode an audio signal, based on the reconstructed second parameter.

The at least one processor may be further configured to obtain a corrected second parameter by correcting the reconstructed second parameter, based on the characteristics of the second parameter, and decode the audio signal, based on the corrected second parameter.

The at least one processor may be further configured to determine the characteristics of the second parameter by using a machine learning model pre-trained based on at least one of the first and second parameters.

The at least one processor may be further configured to obtain the reconstructed second parameter by determining candidates of the second parameter based on the characteristics of the second parameter, and selecting one of the candidates of the second parameter, based on the machine learning model.

The at least one processor may be further configured to obtain the reconstructed second parameter of the current frame, further based on at least one of a plurality of decoding parameters of a previous frame.

The machine learning model may be generated by machine-learning an original audio signal and at least one of the plurality of decoding parameters.

According to another aspect of the present disclosure, an audio reconstruction device includes a memory storing a received bitstream, and at least one processor configured to obtain a plurality of decoding parameters of a current frame by decoding the bitstream, decode an audio signal, based on the plurality of decoding parameters, select a machine learning model from among a plurality of machine learning models, based on the decoded audio signal and at least one of the plurality of decoding parameters, and reconstruct the decoded audio signal by using the selected machine learning model.

According to another aspect of the present disclosure, a computer-readable recording medium has recorded thereon a computer program for executing the above method.

MODE OF DISCLOSURE

Figure 1:
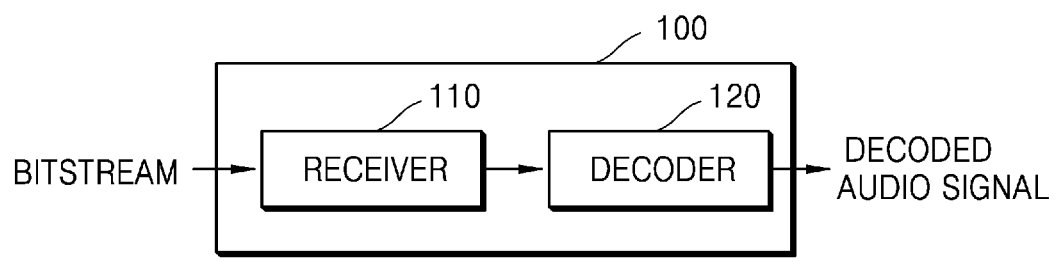
FIG. 1 is a block diagram of an audio reconstruction device according to an embodiment.

One or more embodiments of the disclosure and methods of accomplishing the same may be understood more readily by reference to the following detailed description and the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art.

Terminology used in this specification will now be briefly described before describing the disclosure in detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in relevant parts of the disclosure. Therefore, it is noted that the terms used herein are construed based on practical meanings thereof and the whole content of this specification, rather than being simply construed based on names of the terms.

As used herein, the singular forms "a", "an", and "the" are intended to include the plural forms as well, unless the context clearly indicates otherwise. In addition, the plural forms are intended to include the singular forms as well, unless the context clearly indicates otherwise.

It will be understood that the terms "comprises", "comprising", "includes" and/or "including", when used herein, specify the presence of stated elements, but do not preclude the presence or addition of one or more other elements.

As used herein, the term "unit" denotes a software or hardware element and performs a certain function. However, the "unit" is not limited to software or hardware. The "unit" may be formed so as to be in an addressable storage medium, or may be formed so as to operate one or more processors. Thus, for example, the "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units".

According to an embodiment of the disclosure, the "unit" may be implemented as a processor and a memory. The term "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The term "processor" may refer to a combination of processing devices, e.g., a combination of a DSP and a microprocessor, a combination of a plurality of microprocessors, a combination of one or more microprocessors in conjunction with a DSP core, or a combination of any other such configurations.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storages, and registers. A memory is said to be in electronic communication with a processor when the processor may read information from and/or record information on the memory. A memory that is integrated with a processor is in electronic communication with the processor.

Hereinafter, the disclosure will be described in detail by explaining embodiments of the disclosure with reference to the attached drawings. In the drawings, parts not related to embodiments of the disclosure are not illustrated for clarity of explanation.

High-quality audio contents require high service prices and high-quality audio codecs and thus may cause royalty problems. Furthermore, because high-quality audio services have started recently, audio recorded with high quality may not be present. Therefore, the necessity of a technology for reconstructing audio encoded with low quality, to high quality is increasing. One of methods usable to reconstruct audio encoded with low quality, to high quality is a method using machine learning. A method of improving the quality of decoded audio by using decoding parameters of a codec and machine learning will now be described with reference to FIGS. 1 to 15.

FIG. 1 is a block diagram of an audio reconstruction device 100 according to an embodiment.

The audio reconstruction device 100 may include a receiver 110 and a decoder 120. The receiver 110 may receive a bitstream. The decoder 120 may output an audio signal decoded based on the received bitstream. The audio reconstruction device 100 will now be described in detail with reference to FIG. 2.

Figure 2:
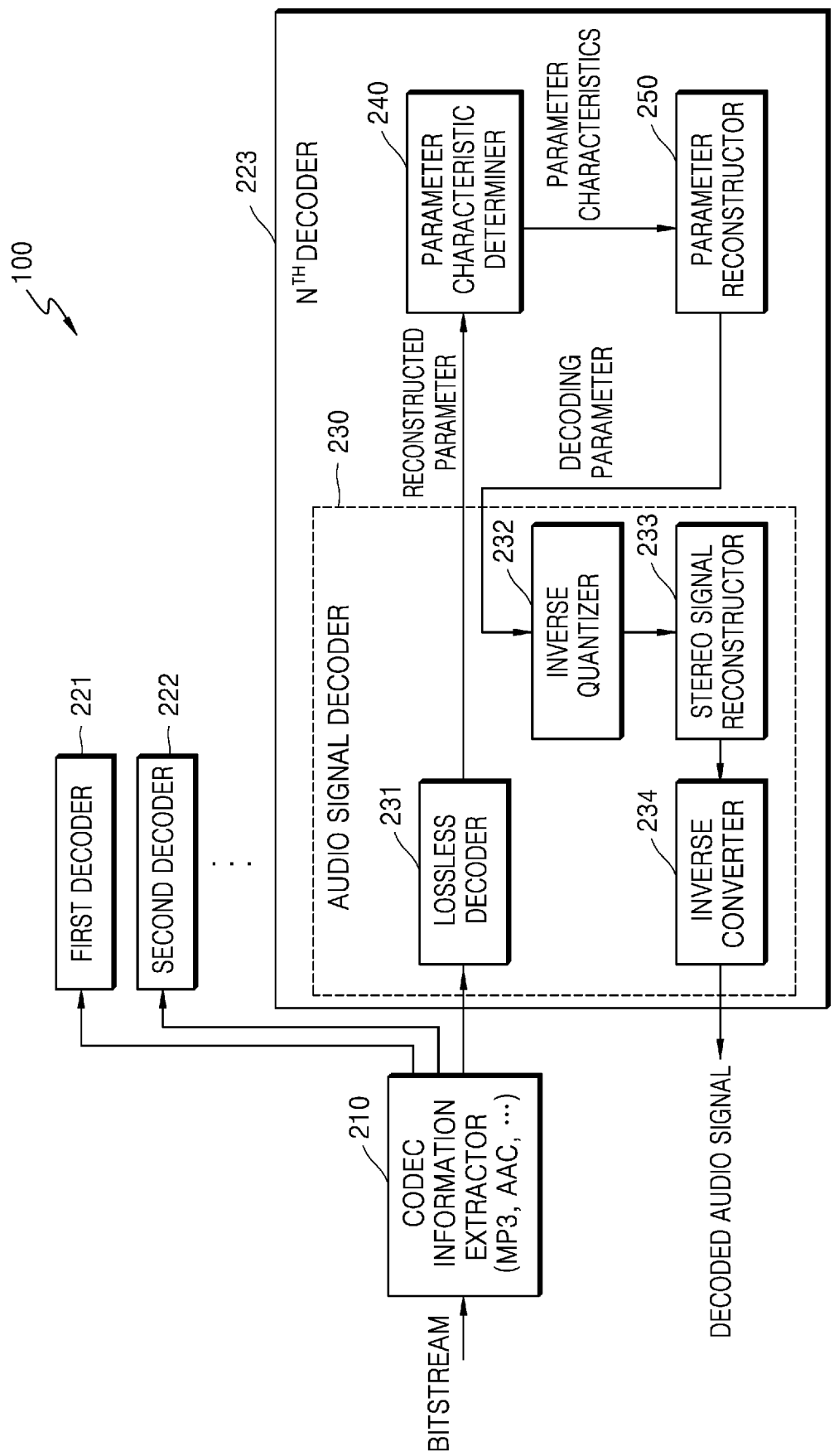
FIG. 2 is a block diagram of the audio reconstruction device according to an embodiment.

FIG. 2 is a block diagram of the audio reconstruction device 100 according to an embodiment.

The audio reconstruction device 100 may include a codec information extractor 210 and at least one decoder. The codec information extractor 210 may equally correspond to the receiver 110 of FIG. 1. The at least one decoder may include at least one of a first decoder 221, a second decoder 222, and an $N^{th}$ decoder 223. At least one of the first decoder 221, the second decoder 222, and the $N^{th}$ decoder 223 may equally correspond to the decoder 120 of FIG. 1.

The codec information extractor 210 may receive a bitstream. The bitstream may be generated by an encoding device. The encoding device may encode and compress original audio into the bitstream. The codec information extractor 210 may receive the bitstream from the encoding device or a storage medium through wired or wireless communication. The codec information extractor 210 may store the bitstream in a memory. The codec information extractor 210 may extract various types of information from the bitstream. The various types of information may include codec information. The codec information may include information about a technique used to encode the original audio. The technique used to encode the original audio may include, for example, an MPEG Layer-3 (MP3), advanced audio coding (AAC), or high-efficiency AAC (HE-AAC) technique. The codec information extractor 210 may select a decoder from among the at least one decoder, based on the codec information.

The at least one decoder may include the first decoder 221, the second decoder 222, and the $N^{th}$ decoder 223. The decoder selected from among the at least one decoder by the codec information extractor 210 may decode an audio signal, based on the bitstream. The $N^{th}$ decoder 223 will now be described for convenience of explanation. The first and second decoders 221 and 222 may have structures similar to that of the $N^{th}$ decoder 223.

The $N^{th}$ decoder 223 may include an audio signal decoder 230. The audio signal decoder 230 may include a lossless decoder 231, an inverse quantizer 232, a stereo signal reconstructor 233, and an inverse converter 234.

The lossless decoder 231 may receive the bitstream. The lossless decoder 231 may decode the bitstream and output at least one decoding parameter. The lossless decoder 231 may decode the bitstream without loss of information. The inverse quantizer 232 may receive the at least one decoding parameter from the lossless decoder 231. The inverse quantizer 232 may inversely quantize the at least one decoding parameter. The inversely quantized decoding parameter may be a mono signal. The stereo signal reconstructor 233 may reconstruct a stereo signal, based on the inverse-quantized decoding parameter. The inverse converter 234 may convert the stereo signal of the frequency domain and output a decoded audio signal of the time domain.

The decoding parameter may include at least one of a spectral bin, a scale factor gain, a global gain, spectral data, and a window type. The decoding parameter may be a parameter used by a codec such as an MP3, AAC, or HE-AAC codec. However, the decoding parameter is not limited to a specific codec, and a decoding parameter called by a different name may perform a similar function. The decoding parameter may be transmitted in units of a frame. The frame is a unit divided from the original audio signal in the time domain.

The spectral bin may correspond to a signal magnitude according to a frequency in the frequency domain.

The scale factor gain and the global gain are values for scaling the spectral bin. The scale factor may have different values for a plurality of bands included in a frame.

The global gain may have the same value for all bands in a frame. The audio reconstruction device 100 may obtain the audio signal of the frequency domain by multiplying the spectral bin by the scale factor gain and the global gain.

The spectral data is information indicating characteristics of the spectral bin. The spectral data may indicate a sign of the spectral bin. The spectral data may indicate whether the spectral bin has a value 0 or not.

The window type may indicate characteristics of the original audio signal. The window type may correspond to a time period for converting the original audio signal of the time domain to the frequency domain. When the original audio signal is a stationary signal that rarely changes, the window type may indicate "long". When the original audio signal is a transient signal that greatly changes, the window type may indicate "short".

The $N^{th}$ decoder 223 may include at least one of a parameter characteristic determiner 240 and a parameter reconstructor 250. The parameter characteristic determiner 240 may receive the at least one decoding parameter and determine characteristics of the at least one decoding parameter. The parameter characteristic determiner 240 may use machine learning to determine the characteristics of the at least one decoding parameter. The parameter characteristic determiner 240 may use a first decoding parameter included in the at least one decoding parameter, to determine characteristics of a second decoding parameter included in the at least one decoding parameter. The parameter characteristic determiner 240 may output at least one of the decoding parameter and the characteristics of the decoding parameter to the parameter reconstructor 250. The parameter characteristic determiner 240 will be described in detail below with reference to FIGS. 4 to 6.

According to an embodiment of the disclosure, the parameter reconstructor 250 may receive the at least one decoding parameter from the lossless decoder 231. The parameter reconstructor 250 may reconstruct the at least one decoding parameter. The parameter reconstructor 250 may use a machine learning model to reconstruct the at least one decoding parameter. The audio signal decoder 230 may output the decoded audio signal close to the original audio, based on the reconstructed at least one decoding parameter.

According to another embodiment of the disclosure, the parameter reconstructor 250 may receive the at least one decoding parameter and the characteristics of the decoding parameter from the parameter characteristic determiner 240. The parameter reconstructor 250 may output the reconstructed parameter by applying the machine learning model to the at least one decoding parameter and the characteristics of the decoding parameter. The parameter reconstructor 250 may output the reconstructed parameter by applying the machine learning model to the at least one decoding parameter. The parameter reconstructor 250 may correct the reconstructed parameter, based on the parameter characteristics. The parameter reconstructor 250 may output the corrected parameter. The audio signal decoder 230 may output the decoded audio signal close to the original audio, based on the corrected parameter.

The parameter reconstructor 250 may output at least one of the reconstructed at least one decoding parameter and the corrected parameter to the parameter characteristic determiner 240 or the parameter reconstructor 250. At least one of the parameter characteristic determiner 240 and the parameter reconstructor 250 may receive at least one of at least one decoding parameter and a corrected parameter of a previous frame. The parameter characteristic determiner 240 may output parameter characteristics of a current frame, based on at least one of the at least one decoding parameter and the corrected parameter of the previous frame. The parameter reconstructor 250 may obtain a reconstructed parameter of the current frame, based on at least one of the at least one decoding parameter and the corrected parameter of the previous frame.

The parameter characteristic determiner 240 and the parameter reconstructor 250 will now be described in detail with reference to FIGS. 3 to 11.

Figure 3:
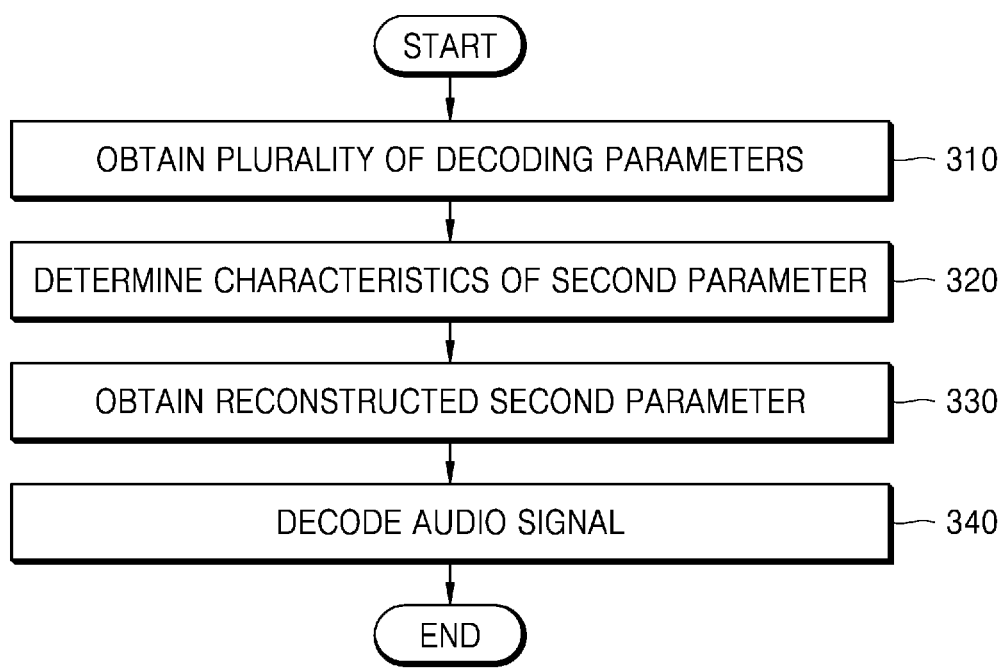
FIG. 3 is a flowchart of an audio reconstruction method according to an embodiment.

FIG. 3 is a flowchart of an audio reconstruction method according to an embodiment.

In operation 310, the audio reconstruction device 100 may obtain a plurality of decoding parameters of a current frame by decoding a bitstream. In operation 320, the audio reconstruction device 100 may determine characteristics of a second parameter. In operation 330, the audio reconstruction device 100 may obtain a reconstructed second parameter by using a machine learning model. In operation 340, the audio reconstruction device 100 may decode an audio signal, based on the reconstructed second parameter.

The audio reconstruction device 100 may obtain the plurality of decoding parameters of the current frame by decoding the bitstream (operation 310). The lossless decoder 231 may obtain the plurality of decoding parameters by decoding the bitstream. The lossless decoder 231 may output a decoding parameter to the inverse quantizer 232, the parameter characteristic determiner 240, or the parameter reconstructor 250. The audio reconstruction device 100 may determine where to output the decoding parameter, by analyzing the decoding parameter. According to an embodiment of the disclosure, the audio reconstruction device 100 may determine where to output the decoding parameter, based on pre-determined rules. However, the disclosure is not limited thereto and the bitstream may include information about where the decoding parameter needs to be output. The audio reconstruction device 100 may determine where to output the decoding parameter, based on the information included in the bitstream.

When high sound quality may be ensured without modifying at least one decoding parameter from among the plurality of decoding parameters, the audio reconstruction device 100 may not modify the at least one decoding parameter. The lossless decoder 231 may output the at least one decoding parameter to the inverse quantizer 232. The at least one decoding parameter does not pass through the parameter characteristic determiner 240 or the parameter reconstructor 250 and thus may not be modified. The audio reconstruction device 100 does not use the parameter characteristic determiner 240 and the parameter reconstructor 250 for some decoding parameters and thus may efficiently use computing resources.

According to an embodiment of the disclosure, the audio reconstruction device 100 may determine to modify at least one decoding parameter. The lossless decoder 231 may output the at least one decoding parameter to the parameter reconstructor 250. The audio reconstruction device 100 may obtain a reconstructed decoding parameter, based on the decoding parameter by using the machine learning model. The audio reconstruction device 100 may decode the audio signal, based on the reconstructed decoding parameter. The audio reconstruction device 100 may provide the audio signal with improved quality, based on the reconstructed decoding parameter. The machine learning model will be described in detail below with reference to FIG. 4.

According to another embodiment of the disclosure, the audio reconstruction device 100 may determine to modify the plurality of decoding parameters. The lossless decoder 231 may output the plurality of decoding parameters to the parameter characteristic determiner 240.

The parameter characteristic determiner 240 may determine characteristics of the second parameter included in the plurality of decoding parameters, based on a first parameter included in the plurality of decoding parameters (operation 320). The second parameter may be associated with the first parameter. The first parameter may directly or indirectly represent the characteristics of the second parameter. For example, the first parameter may include at least one of a scale factor gain, a global gain, spectral data, and a window type of the second parameter.

The first parameter may be a parameter adjacent to the second parameter. The first parameter may be a parameter included in the same band or frame as the second parameter. The first parameter may be a parameter included in a band or frame adjacent to the band or frame including the second parameter.

Although the first and second parameters are described herein as different parameters for convenience of explanation, the first parameter may be the same as the second parameter. That is, the parameter characteristic determiner 240 may determine the characteristics of the second parameter, based on the second parameter.

The parameter reconstructor 250 may obtain the reconstructed second parameter by applying the machine learning model to at least one of the plurality of decoding parameters, the second parameter, and the characteristics of the second parameter (operation 330). The audio reconstruction device 100 may decode the audio signal, based on the reconstructed second parameter (operation 340). The decoded audio signal based on the second parameter reconstructed by applying the machine learning model may provide excellent quality. The machine learning model will now be described in detail with reference to FIG. 4.

Figure 4:
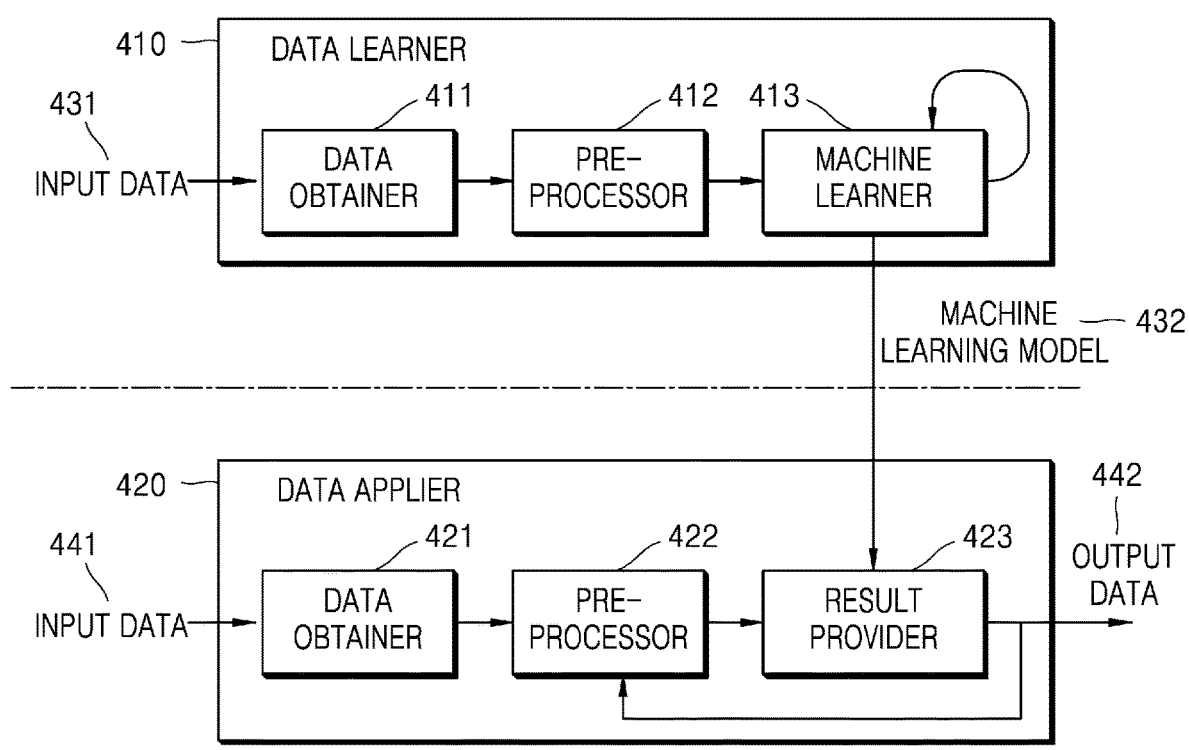
FIG. 4 is a block diagram for describing machine learning according to an embodiment.

FIG. 4 is a block diagram for describing machine learning according to an embodiment.

A data learner 410 and a data applier 420 may operate at different times. For example, the data learner 410 may operate earlier than the data applier 420. The parameter characteristic determiner 240 and the parameter reconstructor 250 may include at least one of the data learner 410 and the data applier 420.

Referring to FIG. 4, the data learner 410 according to an embodiment may include a data obtainer 411, a pre-processor 412, and a machine learner 413. A procedure in which the data learner 410 receives input data 431 and outputs a machine learning model 432 may be called a training procedure.

The data obtainer 411 may receive the input data 431. The input data 431 may include at least one of an original audio signal and decoding parameters. The original audio signal may be an audio signal recorded with high quality. The original audio signal may be represented in the frequency domain or the time domain. The decoding parameters may correspond to a result of encoding the original audio signal. Some information may be lost when the original audio signal is encoded. That is, an audio signal decoded based on a plurality of decoding parameters may have lower quality compared to the original audio signal.

The pre-processor 412 may pre-process the input data 431 to be usable for learning. The pre-processor 412 may process the input data 431 to a preset format in such a manner that the machine learner 413 to be described below may use the input data 431. When the original audio signal and the plurality of decoding parameters have different formats, the original audio signal or the plurality of decoding parameters may be converted to the format of the other. For example, when the original audio signal and the plurality of decoding parameters are related to different codecs, codec information of the original audio signal and the plurality of decoding parameters may be modified to achieve compatibility therebetween. When the original audio signal and the plurality of decoding parameters are represented in different domains, they may be modified to be represented in the same domain.

The pre-processor 412 may select data required for learning, from the input data 431. The selected data may be provided to the machine learner 413. The pre-processor 412 may select the data required for learning, from the pre-processed data according to a preset criterion. The pre-processor 412 may select the data according to a criterion preset through learning by the machine learner 413 to be described below. Because huge input data requires a long data processing time, when a part of the input data 431 is selected, efficiency of data processing may be increased.

The machine learner 413 may output the machine learning model 432, based on the selected input data. The selected input data may include at least one of the original audio signal and the plurality of decoding parameters. The machine learning model 432 may include a criterion for reconstructing at least one parameter from among the plurality of decoding parameters. The machine learner 413 may learn to minimize a difference between the original audio signal and the audio signal decoded based on a reconstructed decoding parameter. The machine learner 413 may learn a criterion for selecting a part of the input data 431 to reconstruct the at least one parameter from among the plurality of decoding parameters.

The machine learner 413 may learn the machine learning model 432 by using the input data 431. In this case, the machine learning model 432 may be a pre-trained model. For example, the machine learning model 432 may be a model pre-trained by receiving default training data (e.g., at least one decoding parameter). The default training data may be initial data for constructing the pre-trained model.

The machine learning model 432 may be selected considering, for example, an application field of the machine learning model 432, a purpose of learning, or computing performance of a device. The machine learning model 432 may be, for example, a model based on a neural network. For example, the machine learning model 432 may use a deep neural network (DNN) model, a recurrent neural network (RNN) model, or a bidirectional recurrent deep neural network (BRDNN) model, but is not limited thereto.

According to various embodiments, when a plurality of pre-constructed machine learning models are present, the machine learner 413 may determine a machine learning model highly relevant to the input data 431 or the default training data, as a machine learning model to be trained. In this case, the input data 431 or the default training data may be pre-classified according to data types, and the machine learning models may be pre-constructed according to the data types. For example, the input data 431 or the default training data may be pre-classified according to various criteria such as data-generated regions, data-generated times, data sizes, data genres, data generators, object types in data, and data formats.

The machine learner 413 may train the machine learning model 432 by using, for example, a learning algorithm such as error back-propagation or gradient descent.

The machine learner 413 may train the machine learning model 432 through, for example, supervised learning using the input data 431 as an input value. The machine learner 413 may train the machine learning model 432 through, for example, unsupervised learning for finding a criterion for making a decision, by autonomously learning the type of data required to make the decision. The machine learner 413 may train the machine learning model 432 through, for example, reinforcement learning using a feedback on whether a result of a decision made through learning is correct.

The machine learner 413 may perform machine learning by using Equations 1 and 2.

$$\text{evidence}_i = \sum_j W_{i,j} x_j + b_i \qquad \text{Equation 1}$$

$$y = \text{softmax}(\text{evidence}_i) \qquad \text{Equation 2}$$

In Equations 1 and 2, x denotes selected input data used for a machine learning model, y denotes a probability of each candidate, i denotes an index of the candidate, j denotes an index of the selected input data used for the machine learning model, W denotes a weight matrix of input data, and b denotes a deflection parameter.

The machine learner 413 may obtain predicted data by using an arbitrary weight W and an arbitrary deflection parameter b. The predicted data may be a reconstructed decoding parameter. The machine learner 413 may calculate a cost of y. The cost may be a difference between actual data and the predicted data. For example, the cost may be a difference between data related to the original audio signal and data related to the reconstructed decoding parameter. The machine learner 413 may update the weight W and the deflection parameter b to minimize the cost.

The machine learner 413 may obtain a weight and a deflection parameter corresponding to the minimum cost. The machine learner 413 may represent the weight and the deflection parameter corresponding to the minimum cost, in a matrix. The machine learner 413 may obtain the machine learning model 432 by using at least one of the weight and the deflection parameter corresponding to the minimum cost. The machine learning model 432 may correspond to a matrix of weights and a matrix of deflection parameters.

When the machine learning model 432 is trained, the machine learner 413 may store the trained machine learning model 432. In this case, the machine learner 413 may store the trained machine learning model 432 in a memory of the data learner 410. The machine learner 413 may store the trained machine learning model 432 in a memory of the data applier 420 to be described below. Alternatively, the machine learner 413 may store the trained machine learning model 432 in a memory of an electronic device or a server connected to a wired or wireless network.

In this case, the memory in which the trained machine learning model 432 is stored may also store, for example, commands or data related to at least one other element of the electronic device. The memory may store software and/or programs. The programs may include, for example, a kernel, middleware, an application programming interface (API), and/or application programs (or "applications").

A model evaluator (not shown) may input evaluation data to the machine learning model 432, and request the machine learner 413 to learn again when results output using the evaluation data do not satisfy a certain criterion. In this case, the evaluation data may be preset data for evaluating the machine learning model 432.

For example, when the number or a ratio of pieces of the evaluation data corresponding to inaccurate results from among the results of the machine learning model 432 trained based on the evaluation data exceeds a preset threshold, the model evaluator may evaluate that the certain criterion is not satisfied. For example, when the certain criterion is defined as a ratio of 2% and when the trained machine learning model 432 outputs wrong results with respect to more than 20 pieces of the evaluation data from among a total of 1,000 pieces of the evaluation data, the model evaluator may evaluate that the trained machine learning model 432 is not appropriate.

When a plurality of trained machine learning models are present, the model evaluator may evaluate whether each of the trained machine learning models satisfies the certain criterion and determine a model satisfying the certain criterion, as a final machine learning model. In this case, when a plurality of machine learning models satisfy the certain criterion, the model evaluator may determine any machine learning model or a certain number of machine learning models preset in order of evaluation scores, as a final machine learning model(s) 432.

At least one of the data obtainer 411, the pre-processor 412, the machine learner 413, and the model evaluator in the data learner 410 may be produced in the form of at least one hardware chip and be mounted in the electronic device. For example, at least one of the data obtainer 411, the pre-processor 412, the machine learner 413, and the model evaluator may be produced in the form of a dedicated hardware chip for AI or as a part of a general-purpose processor (e.g., a central processing unit (CPU) or an application processor) or a dedicated graphics processor (e.g., a graphics processing unit (GPU)), and be mounted in various electronic devices.

The data obtainer 411, the pre-processor 412, the machine learner 413, and the model evaluator may be mounted in one electronic device or be mounted separately in different electronic devices. For example, some of the data obtainer 411, the pre-processor 412, the machine learner 413, and the model evaluator may be included in the electronic device, and the others may be included in the server.

At least one of the data obtainer 411, the pre-processor 412, the machine learner 413, and the model evaluator may be implemented as a software module. When at least one of the data obtainer 411, the pre-processor 412, the machine learner 413, and the model evaluator is implemented as a software module (or a program module including instructions), the software module may be stored in a non-transitory computer-readable medium. In this case, at least one software module may be provided by an operating system (OS) or a certain application. Alternatively, some of the at least one software module may be provided by the OS and the others may be provided by the certain application.

Referring to FIG. 4, the data applier 420 according to an embodiment may include a data obtainer 421, a pre-processor 422, and a result provider 423. A procedure in which the data applier 420 receives input data 441 and the machine learning model 432 and outputs output data 442 may be called a test procedure.

The data obtainer 421 may obtain the input data 441. The input data 441 may include at least one decoding parameter for decoding the audio signal. The pre-processor 422 may pre-process the input data 441 to be usable. The pre-processor 422 may process the input data 441 to a preset format in such a manner that the result provider 423 to be described below may use the input data 441.

The pre-processor 422 may select data to be used by the result provider 423, from the pre-processed input data. The pre-processor 422 may select at least one decoding parameter to be used to improve the quality of the audio signal, from the pre-processed input data. The selected data may be provided to the result provider 423. The pre-processor 422 may select a part or the entirety of the pre-processed input data according to a preset criterion for improving the quality of the audio signal. The pre-processor 422 may select the data according to a criterion preset through learning by the machine learner 413.

The result provider 423 may output the output data 442 by applying the data selected by the pre-processor 422, to the machine learning model 432. The output data 442 may be the reconstructed decoding parameter for providing improved sound quality. The audio reconstruction device 100 may output the decoded audio signal close to the original audio signal, based on the reconstructed decoding parameter.

The result provider 423 may provide the output data 442 to the pre-processor 422. The pre-processor 422 may pre-process the output data 442 and provide the same to the result provider 423. For example, the output data 442 may be the reconstructed decoding parameter of a previous frame. The result provider 423 may provide the output data 442 of the previous frame to the pre-processor 422. The pre-processor 422 may provide the selected decoding parameter of a current frame and the reconstructed decoding parameter of the previous frame to the result provider 423. The result provider 423 may generate the output data 442 of the current frame by reflecting not only the reconstructed decoding parameter of the current frame but also information about the previous frame. The output data 442 of the current frame may include at least one of the reconstructed decoding parameter and a corrected decoding parameter of the current frame. The audio reconstruction device 100 may provide higher-quality audio, based on the output data 442 of the current frame.

The model updater (not shown) may control the machine learning model 432 to be updated, based on evaluation of the output data 442 provided by the result provider 423. For example, the model updater may request the machine learner 413 to update the machine learning model 432, by proving the output data 442 provided by the result provider 423, to the machine learner 413.

At least one of the data obtainer 421, the pre-processor 422, the result provider 423, and the model updater in the data applier 420 may be produced in the form of at least one hardware chip and be mounted in the electronic device. For example, at least one of the data obtainer 421, the pre-processor 422, the result provider 423, and the model updater may be produced in the form of a dedicated hardware chip for AI or as a part of a general-purpose processor (e.g., a CPU or an application processor) or a dedicated graphics processor (e.g., a GPU), and be mounted in various electronic devices.

The data obtainer 421, the pre-processor 422, the result provider 423, and the model updater may be mounted in one electronic device or be mounted separately in different electronic devices. For example, some of the data obtainer 421, the pre-processor 422, the result provider 423, and the model updater may be included in the electronic device, and the others may be included in the server.

At least one of the data obtainer 421, the pre-processor 422, the result provider 423, and the model updater may be implemented as a software module. When at least one of the data obtainer 421, the pre-processor 422, the result provider 423, and the model updater is implemented as a software module (or a program module including instructions), the software module may be stored in a non-transitory computer-readable medium. In this case, at least one software module may be provided by an OS or a certain application. Alternatively, some of the at least one software module may be provided by the OS and the others may be provided by the certain application.

Operations of the audio reconstruction device 100 of FIG. 1 and the data learner 410 and the data applier 420 of FIG. 4 will now be described in detail with reference to FIGS. 5 to 11.

Figure 5:
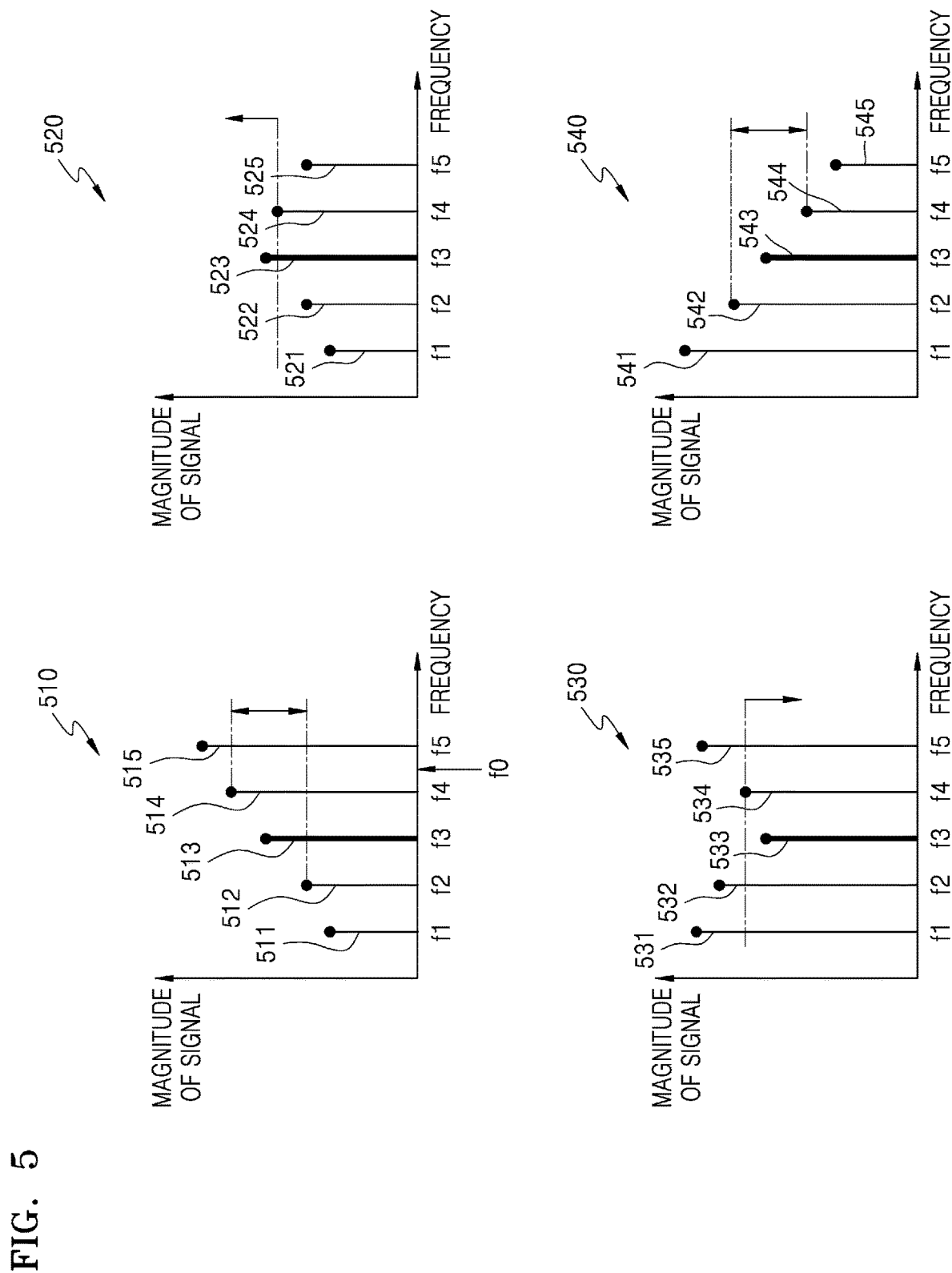
FIG. 5 shows prediction of characteristics of a decoding parameter, according to an embodiment.

FIG. 5 shows prediction of characteristics of a decoding parameter, according to an embodiment.

The parameter characteristic determiner 240 may determine characteristics of a decoding parameter. The audio reconstruction device 100 does not need to process a parameter not satisfying the characteristics of the decoding parameter and thus may reduce the amount of calculation. The audio reconstruction device 100 may prevent a reconstructed decoding parameter from being output with worse quality compared to an input decoding parameter.

A graph 510 shows signal magnitudes according to frequencies in a frame. A plurality of decoding parameters obtained based on a bitstream by the audio reconstruction device 100 may include signal magnitudes according to frequencies. For example, the signal magnitudes may correspond to spectral bins.

The plurality of decoding parameters may include a first parameter and a second parameter. The parameter characteristic determiner 240 may determine characteristics of the second parameter, based on the first parameter. The first parameter may be a parameter adjacent to the second parameter. The audio reconstruction device 100 may determine the characteristics of the second parameter, based on a trend of the first parameter. The characteristics of the second parameter may include a range of the second parameter.

According to an embodiment of the disclosure, the second parameter may be a signal magnitude 513 at a frequency f3. The first parameter may include signal magnitudes 511, 512, 514, and 515 corresponding to frequencies f1, f2, f4, and f5. The audio reconstruction device 100 may determine that the signal magnitudes 511, 512, 514, and 515 corresponding to the first parameter are in a rising trend. Therefore, the audio reconstruction device 100 may determine a range of the signal magnitude 513 corresponding to the second parameter, to be between the signal magnitudes 512 and 514.

The parameter characteristic determiner 240 of FIG. 2 may include the data learner 410 of FIG. 4. The machine learning model 432 may be pre-trained by the data learner 410.

For example, the data learner 410 of the parameter characteristic determiner 240 may receive information corresponding to an original audio signal. The information corresponding to the original audio signal may be the original audio signal itself or information obtained by encoding the original audio signal with high quality. The data learner 410 of the parameter characteristic determiner 240 may receive the decoding parameters. The parameters received by the data learner 410 of the parameter characteristic determiner 240 may correspond to at least one frame. The data learner 410 of the parameter characteristic determiner 240 may output the machine learning model 432, based on operations of the data obtainer 411, the pre-processor 412, and the machine learner 413. The machine learning model 432 of the data learner 410 may be a machine learning model for determining the characteristics of the second parameter, based on the first parameter. For example, the machine learning model 432 may be given as a weight for each of at least one first parameter.

The parameter characteristic determiner 240 may include the data applier 420 of FIG. 4. The parameter characteristic determiner 240 may determine the characteristics of the second parameter, based on at least one of the first and second parameters. The parameter characteristic determiner 240 may use a pre-trained machine learning model to determine the characteristics of the second parameter.

For example, the data applier 420 of the parameter characteristic determiner 240 may receive at least one of the first and second parameters included in the plurality of decoding parameters of a current frame. The data applier 420 of the parameter characteristic determiner 240 may receive the machine learning model 432 from the data learner 410 of the parameter characteristic determiner 240. The data applier 420 of the parameter characteristic determiner 240 may determine the characteristics of the second parameter, based on operations of the data obtainer 421, the pre-processor 422, and the result provider 423. For example, the data applier 420 of the parameter characteristic determiner 240 may determine the characteristics of the second parameter by applying the machine learning model 432 to at least one of the first and second parameters.

According to another embodiment of the disclosure, the audio reconstruction device 100 may provide high-bitrate audio by reconstructing the second parameter not included in the bitstream. The second parameter may be a signal magnitude at a frequency f0. The bitstream may not include information about the signal magnitude at the frequency f0. The audio reconstruction device 100 may estimate signal characteristics at the frequency f0, based on the first parameter. The first parameter may include the signal magnitudes 511, 512, 513, 514, and 515 corresponding to the frequencies f1, f2, f3, f4, and f5. The audio reconstruction device 100 may determine that the signal magnitudes 511, 512, 513, 514, and 515 corresponding to the first parameter are in a rising trend. Therefore, the audio reconstruction device 100 may determine a range of the signal magnitude corresponding to the second parameter, to be between the signal magnitudes 514 and 515. The audio reconstruction device 100 may include at least one of the data learner 410 and the data applier 420 of FIG. 4. A detailed description of operation of the data learner 410 or the data applier 420 is provided above, and thus will not be repeated herein.

Referring to a graph 520, the second parameter may be a signal magnitude 523 at a frequency f3. The first parameter may include signal magnitudes 521, 522, 524, and 525 corresponding to frequencies f1, f2, f4, and f5. The audio reconstruction device 100 may determine that the signal magnitudes 521, 522, 524, and 525 corresponding to the first parameter is in a rising-and-then-falling trend. Because the signal magnitude 524 corresponding to the frequency f4 is greater than the signal magnitude 522 corresponding to the frequency f2, the audio reconstruction device 100 may determine a range of the signal magnitude 523 corresponding to the second parameter, to be greater than or equal to the signal magnitude 524.

Referring to a graph 530, the second parameter may be a signal magnitude 533 at a frequency f3. The first parameter may include signal magnitudes 531, 532, 534, and 535 corresponding to frequencies f1, f2, f4, and f5. The audio reconstruction device 100 may determine that the signal magnitudes 531, 532, 534, and 535 corresponding to the first parameter are in a falling-and-then-rising trend. Because the signal magnitude 534 corresponding to the frequency f4 is less than the signal magnitude 532 corresponding to the frequency f2, the audio reconstruction device 100 may determine a range of the signal magnitude 533 corresponding to the second parameter, to be less than or equal to the signal magnitude 534.

Referring to a graph 540, the second parameter may be a signal magnitude 543 at a frequency f3. The first parameter may include signal magnitudes 541, 542, 544, and 545 corresponding to frequencies f1, f2, f4, and f5. The audio reconstruction device 100 may determine that the signal magnitudes 541, 542, 544, and 545 corresponding to the first parameter are in a falling trend. The audio reconstruction device 100 may determine a range of the signal magnitude 543 corresponding to the second parameter, to be between the signal magnitudes 542 and 544.

Figure 6:
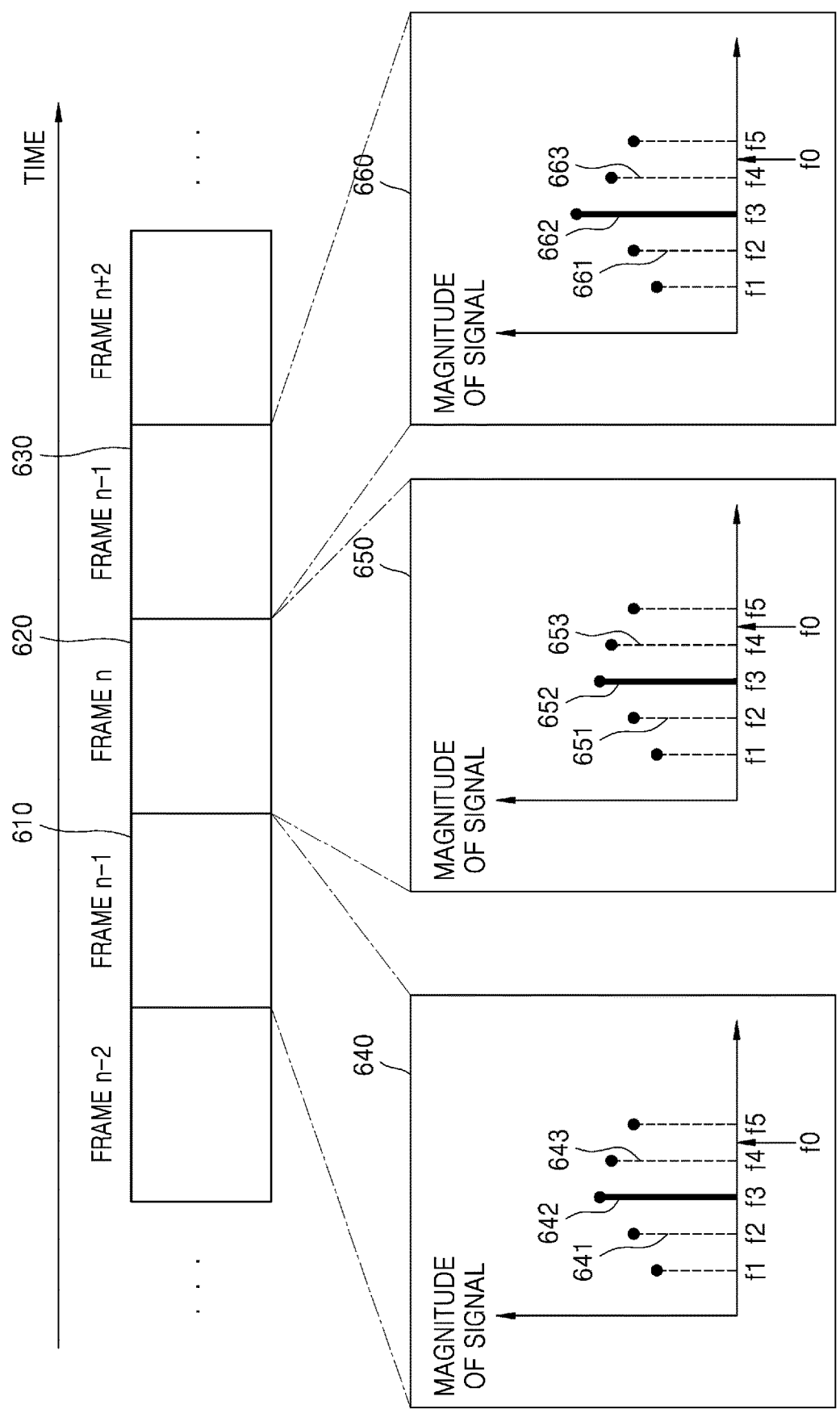
FIG. 6 shows prediction of characteristics of a decoding parameter, according to an embodiment.

FIG. 6 shows prediction of characteristics of a decoding parameter, according to an embodiment.

The audio reconstruction device 100 may use a plurality of frames to determine characteristics of a decoding parameter in a frame. The audio reconstruction device 100 may use previous frames of the frame to determine the characteristics of the decoding parameter in the frame. For example, the audio reconstruction device 100 may use at least one decoding parameter included in a frame n−2, a frame n−1 610, a frame n 620, or a frame n+1 630, to determine characteristics of at least one decoding parameter included in the frame n+1 630.

The audio reconstruction device 100 may obtain decoding parameters from a bitstream. The audio reconstruction device 100 may obtain graphs 640, 650, and 660, based on decoding parameters in a plurality of frames. The graph 640 shows decoding parameters in the frame n−1 610 in the frequency domain. The decoding parameters shown in the graph 640 may represent signal magnitudes according to frequencies. The graph 650 shows signal magnitudes according to frequencies in the frame n 620 in the frequency domain. The graph 660 shows signal magnitudes according to frequencies in the frame n+1 630 in the frequency domain. The audio reconstruction device 100 may determine characteristics of a signal magnitude included in the graph 660, based on at least one signal magnitude included in the graphs 640, 650, and 660.

According to an embodiment of the disclosure, the audio reconstruction device 100 may determine characteristics of a signal magnitude 662 included in the graph 660, based on at least one signal magnitude included in the graphs 640, 650, and 660. The audio reconstruction device 100 may check a trend of signal magnitudes 641, 642, and 643 of the graph 640. The audio reconstruction device 100 may check a trend of signal magnitudes 651, 652, and 653 of the graph 650. The trends may rise and then fall near f3. The audio reconstruction device 100 may determine a trend of the graph 660 based on the graphs 640 and 650. The audio reconstruction device 100 may determine that the signal magnitude 662 is greater than or equal to a signal magnitude 661 and a signal magnitude 663.

According to another embodiment of the disclosure, the audio reconstruction device 100 may determine characteristics of a signal magnitude at f0 in the graph 660, based on at least one signal magnitude included in the graphs 640, 650, and 660. The audio reconstruction device 100 may check a trend of signal magnitudes in the graph 640. The audio reconstruction device 100 may check a trend of signal magnitudes in the graph 650. The trends may fall near f0. The audio reconstruction device 100 may determine a trend of the graph 660, based on the graphs 640 and 650. The audio reconstruction device 100 may determine that the signal magnitude at f0 is less than or equal to a signal magnitude at f4 and is greater than or equal to a signal magnitude at f5. The audio reconstruction device 100 may include at least one of the data learner 410 and the data applier 420 of FIG. 4. A detailed description of operation of the data learner 410 or the data applier 420 is provided above, and thus will not be repeated herein.

According to an embodiment of the disclosure, the audio reconstruction device 100 may use previous frames of a frame to determine characteristics of a decoding parameter included in the frame. The audio reconstruction device 100 may determine characteristics of a signal according to a specific frequency in a current frame, based on signals according to the specific frequency in the previous frames. The audio reconstruction device 100 may determine characteristics of a decoding parameter according to the specific frequency in the current frame, based on, for example, a distribution range, an average, a median, a minimum value, a maximum value, a deviation, or a sign of signals according to the specific frequency in the previous frames.

For example, the audio reconstruction device 100 may determine characteristics of the signal magnitude 662 included in the graph 660, based on at least one signal magnitude included in the graphs 640 and 650. The audio reconstruction device 100 may determine characteristics of the signal magnitude 662 at the frequency f3 in the graph 660, based on the signal magnitude 642 at the frequency f3 in the graph 640 and the signal magnitude 652 at the frequency f3 in the graph 650. The characteristics of the signal magnitude 662 may be based on, for example, a distribution range, an average, a median, a minimum value, a maximum value, a deviation, or a sign of the signal magnitudes 642 and 652.

According to an embodiment of the disclosure, the audio reconstruction device 100 may obtain decoding parameters from the bitstream. The decoding parameters may include a second parameter. Characteristics of the second parameter may be determined based on a pre-determined parameter which is not the decoding parameter.

For example, a quantization step size may not be included in the decoding parameter. The second parameter may correspond to a signal magnitude according to a frequency in a frame. The signal magnitude may correspond to a spectral bin. The audio reconstruction device 100 may determine a range of the spectral bin, based on the quantization step size. The quantization step size is a range of a signal magnitude determined as a spectral bin. The quantization step size may differ per frequency. The quantization step size may be dense in an audible frequency region. The quantization step size may be sparse in a region other than the audible frequency region. Therefore, when a frequency corresponding to the spectral bin is known, the quantization step size may be determined. The range of the spectral bin may be determined based on the quantization step size.

According to another embodiment of the disclosure, the audio reconstruction device 100 may obtain decoding parameters from the bitstream. The decoding parameters may include a first parameter and a second parameter. Characteristics of the second parameter may be determined based on the first parameter. The characteristics of the second parameter may include a range of the second parameter.

For example, the first parameter may include a scale factor and a masking threshold. A quantization step size may be determined based on the scale factor and the masking threshold. As described above, the scale factor is a value for scaling a spectral bin. The scale factor may have different values for a plurality of bands included in a frame. The masking threshold is a minimum magnitude of a current signal to make the current signal audible when noise called a masker is present. The masking threshold may differ per frequency and masker type. The masking threshold may be increased when the masker is close to the current signal in frequency.

For example, the current signal may be present at f0 and a masker signal may be present at f1 close to f0. The masking threshold at f0 may be determined based on the masker of f1. When a magnitude of the current signal of f0 is less than the masking threshold, the current signal may be inaudible sound. Therefore, the audio reconstruction device 100 may ignore the current signal of f0 in an encoding or decoding procedure. Otherwise, when the magnitude of the current signal of f0 is greater than the masking threshold, the current signal may be audible sound. Therefore, the audio reconstruction device 100 may not ignore the current signal of f0 in the encoding or decoding procedure.

The audio reconstruction device 100 may set the quantization step size to a smaller value from among the scale factor and the masking threshold. The audio reconstruction device 100 may determine the range of the spectral bin, based on the quantization step size.

Figure 7:
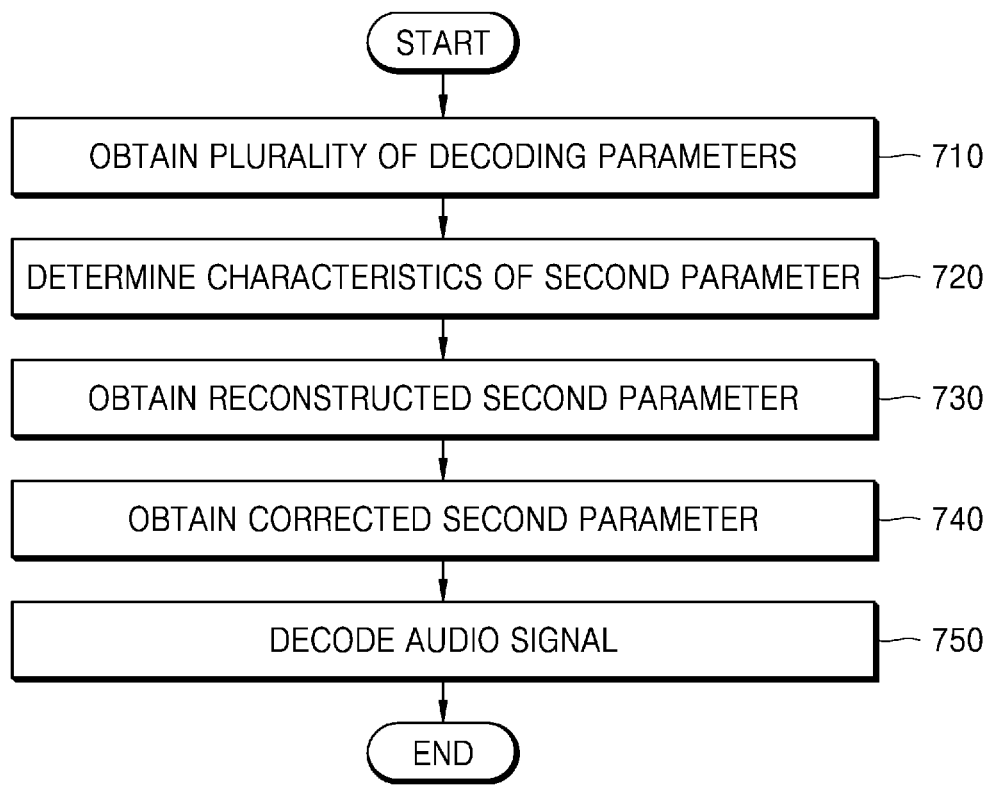
FIG. 7 is a flowchart of an audio reconstruction method according to an embodiment.

FIG. 7 is a flowchart of an audio reconstruction method according to an embodiment.

In operation 710, the audio reconstruction device 100 may obtain a plurality of decoding parameters of a current frame for decoding an audio signal, by decoding a bitstream. In operation 720, the audio reconstruction device 100 may determine characteristics of a second parameter included in the plurality of decoding parameters, based on a first parameter included in the plurality of decoding parameters. In operation 730, the audio reconstruction device 100 may obtain a reconstructed second parameter, based on at least one of the plurality of decoding parameters by using a machine learning model. In operation 740, the audio reconstruction device 100 may obtain a corrected second parameter by correcting the second parameter, based on the characteristics of the second parameter. In operation 750, the audio reconstruction device 100 may decode the audio signal, based on the corrected second parameter.

Operations 710 and 750 may be performed by the audio signal decoder 230. Operation 720 may be performed by the parameter characteristic determiner 240. Operations 730 and 740 may be performed by the parameter reconstructor 250.

Referring back to FIG. 3 according to an embodiment of the disclosure, the data learner 410 and the data applier 420 of the parameter reconstructor 250 may receive the characteristics of the second parameter as input. That is, the parameter reconstructor 250 may perform machine learning, based on the characteristics of the second parameter. The data learner 410 of the parameter reconstructor 250 may output the machine learning model 432 by reflecting the characteristics of the second parameter. The data applier 420 of the parameter reconstructor 250 may output the output data 442 by reflecting the characteristics of the second parameter.

Referring to FIG. 7 according to another embodiment of the disclosure, the data learner 410 and the data applier 420 of the parameter reconstructor 250 may not receive the characteristics of the second parameter as input. That is, the parameter reconstructor 250 may perform machine learning, merely based on decoding parameters not based on the characteristics of the second parameter. The data learner 410 of the parameter reconstructor 250 may output the machine learning model 432 without reflecting the characteristics of the second parameter. The data applier 420 of the parameter reconstructor 250 may output the output data 442 without reflecting the characteristics of the second parameter.

The output data 442 may be the reconstructed second parameter. The parameter reconstructor 250 may determine whether the reconstructed second parameter satisfies the characteristics of the second parameter. When the reconstructed second parameter satisfies the characteristics of the second parameter, the parameter reconstructor 250 may output the reconstructed parameter to the audio signal decoder 230. When the reconstructed second parameter does not satisfy the characteristics of the second parameter, the parameter reconstructor 250 may obtain the corrected second parameter by correcting the reconstructed second parameter, based on the characteristics of the second parameter. The parameter reconstructor 250 may output the corrected parameter to the audio signal decoder 230.

For example, the characteristics of the second parameter may include a range of the second parameter. The audio reconstruction device 100 may determine the range of the second parameter, based on the first parameter. When the reconstructed second parameter is not within the range of the second parameter, the audio reconstruction device 100 may obtain a value of the range, which is closest to the reconstructed second parameter, as the corrected second parameter. A detailed description thereof will now be provided with reference to FIG. 8.

Figure 8:
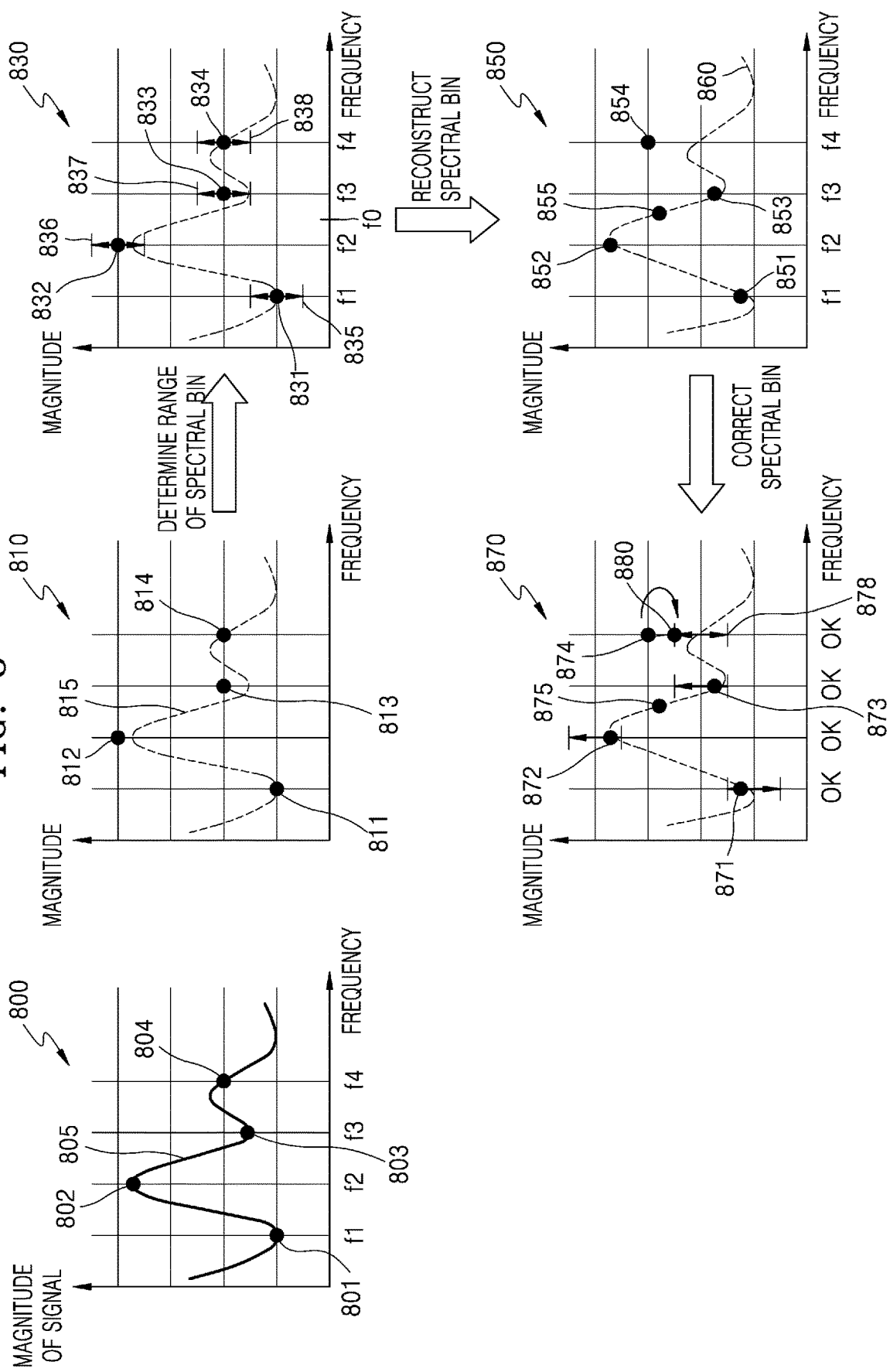
FIG. 8 shows decoding parameters according to an embodiment.

FIG. 8 shows decoding parameters according to an embodiment.

A graph 800 shows signal magnitudes according to frequencies of an original audio signal in the frequency domain. The graph 800 may correspond to a frame of the original audio signal. The original audio signal is represented by a curve 805 having a continuous waveform. The original audio signal may be sampled at frequencies f1, f2, f3, and f4. Magnitudes of the original audio signal at the frequencies f1, f2, f3, and f4 may be represented by dots 801, 802, 803, and 804. The original audio signal may be encoded. The audio reconstruction device 100 may generate decoding parameters by decoding the encoded original audio signal.

A graph 810 shows signal magnitudes according to frequencies. A dashed line 815 shown in the graph 810 may correspond to the original audio signal. Dots 811, 812, 813, and 814 shown in the graph 810 may correspond to the decoding parameters. The decoding parameters may output from the lossless decoder 231 of the audio reconstruction device 100. At least one of the original audio signal and the decoding parameters may be scaled and shown in the graph 810.

As shown in the graph 810, the dashed line 815 may differ from the dots 811, 812, 813, and 814. The difference between the dashed line 815 and the dots 811, 812, 813, and 814 may occur due to errors caused when the original audio signal is encoded and decoded.

The audio reconstruction device 100 may determine characteristics of the decoding parameters corresponding to the dots 811, 812, 813, and 814. The audio reconstruction device 100 may use a machine learning model to determine the characteristics of the decoding parameters. A detailed description of the determination of the characteristics of the decoding parameters is provided above in relation to FIGS. 5 and 6, and thus will not be repeated herein. The decoding parameters may be spectral bins. The characteristics of the decoding parameters may include ranges of the spectral bins.

The ranges of the spectral bins, which are determined by the audio reconstruction device 100, are shown in a graph 830. That is, an arrow 835 represents an available range of a dot 831 corresponding to a spectral bin. An arrow 836 represents an available range of a dot 832 corresponding to a spectral bin. An arrow 837 represents an available range of a dot 833 corresponding to a spectral bin. An arrow 838 represents an available range of a dot 834 corresponding to a spectral bin.

The audio reconstruction device 100 may determine signal characteristics at f0 between f2 and f3. The audio reconstruction device 100 may not receive a decoding parameter at f0. The audio reconstruction device 100 may determine characteristics of the decoding parameter at f0, based on decoding parameters related to f0.

For example, the audio reconstruction device 100 may not receive information about a magnitude of a spectral bin at f0. The audio reconstruction device 100 may determine a range of a signal magnitude at f0, by using spectral bins of frequencies adjacent to f0 and spectral bins of a frame adjacent to a current frame. A detailed description thereof is provided above in relation to FIGS. 5 and 6, and thus will not be repeated herein.

The audio reconstruction device 100 may reconstruct the decoding parameters. The audio reconstruction device 100 may use the machine learning model. To reconstruct the decoding parameters, the audio reconstruction device 100 may apply at least one of the decoding parameters and the characteristics of the decoding parameters to the machine learning model.

The decoding parameters reconstructed by the audio reconstruction device 100 are shown in a graph 850. Dots 851, 852, 853, 854, and 855 represent the reconstructed decoding parameters. The reconstructed decoding parameters may have larger errors compared to the decoding parameters before being reconstructed. For example, although the dot 834 corresponding to a spectral bin in the graph 830 is close to the original audio signal, the dot 854 corresponding to a spectral bin in the graph 850 may be far from the original audio signal represented by a dashed line 860.

The audio reconstruction device 100 may correct the decoding parameters. The audio reconstruction device 100 may determine whether the decoding parameters are within available ranges of the decoding parameters. The audio reconstruction device 100 may correct the decoding parameters when the decoding parameters are not within the available ranges of the decoding parameters. The corrected decoding parameters may be within the available ranges of the decoding parameters.

For example, a graph 870 shows corrected spectral bins. Dots 871, 872, 873, and 875 corresponding to spectral bins may be within available ranges of the spectral bins. However, a dot 874 corresponding to a spectral bin may not be within an available range 878 of the spectral bin. When the reconstructed spectral bin is not within the available range 878 of the spectral bin, the audio reconstruction device 100 may obtain a value of the range 878, which is closest to the reconstructed spectral bin, as a corrected spectral bin. When the dot 874 corresponding to the reconstructed spectral bin has a value greater than a maximum value of the range 878, the audio reconstruction device 100 may obtain the maximum value of the range 878 as a dot 880 corresponding to the corrected spectral bin. That is, the audio reconstruction device 100 may correct the dot 874 corresponding to the reconstructed spectral bin, to the dot 880. The dot 880 may correspond to the corrected spectral bin.

The audio reconstruction device 100 may decode the audio signal, based on the corrected decoding parameters. By the dot 875 corresponding to the reconstructed spectral bin at the frequency f0, a sampling rate of the audio signal may be improved. By the dot 880 corresponding to the reconstructed spectral bin at the frequency f4, a magnitude of the audio signal may be accurately represented. Because the corrected decoding parameters are close to the original audio signal of the frequency domain, the decoded audio signal may be close to the original audio signal.

Figure 9:
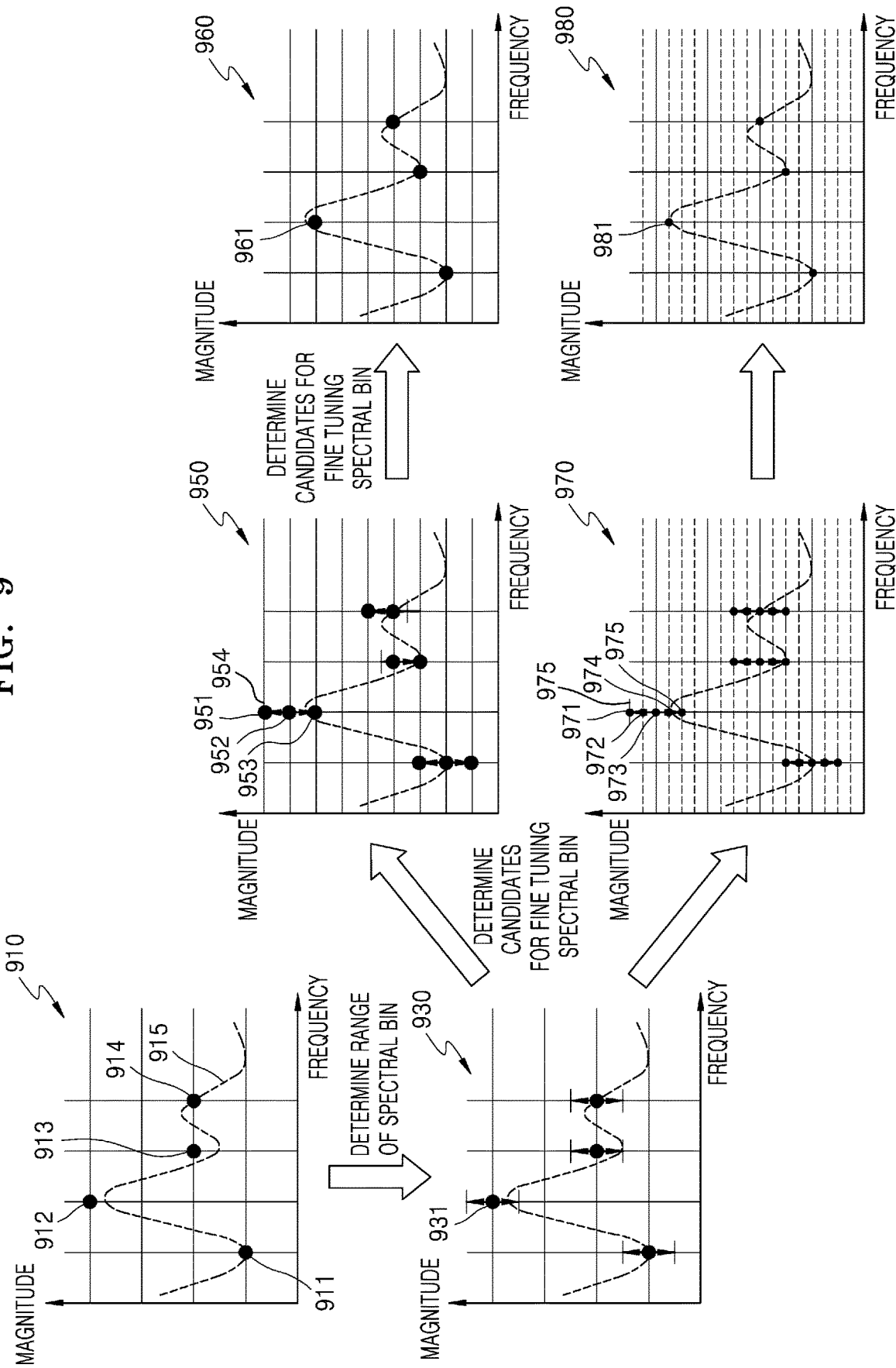
FIG. 9 shows changes in decoding parameters, according to an embodiment.

FIG. 9 shows changes in decoding parameters, according to an embodiment.

A graph 910 corresponds to the graph 810 of FIG. 8. The graph 910 shows signal magnitudes according to frequencies. A dashed line 915 shown in the graph 910 may correspond to an original audio signal. Dots 911, 912, 913, and 914 shown in the graph 910 may correspond to decoding parameters. At least one of the original audio signal and the decoding parameters may be scaled and shown in the graph 910.

The audio reconstruction device 100 may determine characteristics of the decoding parameters corresponding to the dots 911, 912, 913, and 914. The audio reconstruction device 100 may use a machine learning model to determine the characteristics of the decoding parameters. A detailed description of the determination of the characteristics of the decoding parameters is provided above in relation to FIGS. 5 and 6, and thus will not be repeated herein. The decoding parameters may be spectral bins. The characteristics of the decoding parameters may include ranges of the spectral bins. The ranges of the spectral bins, which are determined by the audio reconstruction device 100, are shown in a graph 930.

The audio reconstruction device 100 may determine candidates for fine tuning each spectral bin. The audio reconstruction device 100 may represent the spectral bin by using a plurality of bits. The audio reconstruction device 100 may finely represent the spectral bin in proportion to the number of bits for representing the spectral bin. The audio reconstruction device 100 may increase the number of bits for representing the spectral bin, to fine tune the spectral bin. A case in which the number of bits for representing a spectral bin is increased will now be described with reference to FIG. 10.

Figure 10:
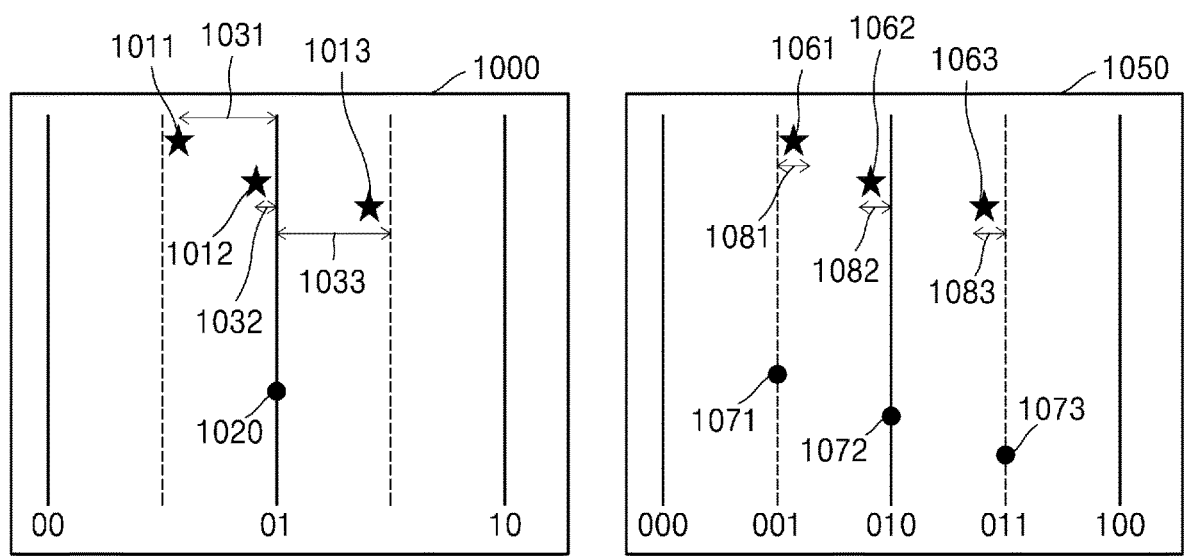
FIG. 10 shows changes in decoding parameters in a case when the number of bits is increased, according to an embodiment.

FIG. 10 shows changes in decoding parameters in a case when the number of bits is increased, according to an embodiment.

Referring to a graph 1000, the audio reconstruction device 100 may use two bits to represent a quantized decoding parameter. In this case, the audio reconstruction device 100 may represent the quantized decoding parameter by using '00', '01', '10', and '11'. That is, the audio reconstruction device 100 may represent four magnitudes of the decoding parameter. The audio reconstruction device 100 may assign a minimum value of the decoding parameter to '00'. The audio reconstruction device 100 may assign a maximum value of the decoding parameter to '11'.

A magnitude of a decoding parameter received by the audio reconstruction device 100 may correspond to a dot 1020. The magnitude of the decoding parameter may be '01'. However, an actual magnitude of the decoding parameter before being quantized may correspond to a star 1011, 1012, or 1013. When the actual magnitude of the decoding parameter corresponds to the star 1011, an error range may correspond to an arrow 1031. When the actual magnitude of the decoding parameter corresponds to the star 1012, an error range may correspond to an arrow 1032. When the actual magnitude of the decoding parameter corresponds to the star 1013, an error range may correspond to an arrow 1033.

Referring to a graph 1050, the audio reconstruction device 100 may use three bits to represent a quantized decoding parameter. In this case, the audio reconstruction device 100 may represent the quantized decoding parameter by using '000', '001', '010', '011', '100', '101', '110', and '111'. That is, the audio reconstruction device 100 may represent eight magnitudes of the decoding parameter. The audio reconstruction device 100 may assign a minimum value of the decoding parameter to '000'. The audio reconstruction device 100 may assign a maximum value of the decoding parameter to '111'.

Magnitudes of decoding parameters received by the audio reconstruction device 100 may correspond to dots 1071, 1072, and 1073. The magnitudes of the decoding parameters may be '001', '010', and '011'. Actual magnitudes of the decoding parameters may correspond to stars 1061, 1062, and 1063. When the actual magnitude of the decoding parameter corresponds to the star 1061, an error range may correspond to an arrow 1081. When the actual magnitude of the decoding parameter corresponds to the star 1062, an error range may correspond to an arrow 1082. When the actual magnitude of the decoding parameter corresponds to the star 1063, an error range may correspond to an arrow 1083.

When the graph 1000 is compared to the graph 1050, an error of a decoding parameter in the graph 1050 is less than an error of a decoding parameter in the graph 1000. As shown in FIG. 10, a decoding parameter may be finely represented in proportion to the number of bits used by the audio reconstruction device 100 to represent the decoding parameter.

Referring back to FIG. 9, the audio reconstruction device 100 may determine candidates for fine tuning each decoding parameter. Referring to a graph 950, the audio reconstruction device 100 may additionally use one bit to represent a decoding parameter. The audio reconstruction device 100 may determine candidates 951, 952, and 953 corresponding to a decoding parameter 931 of the graph 930. The audio reconstruction device 100 may use characteristics of the decoding parameter to determine the candidates 951, 952, and 953 of the decoding parameter. For example, the characteristics of the decoding parameter may include a range 954 of the decoding parameter. The candidates 951, 952, and 953 may be within the range 954 of the decoding parameter.

The audio reconstruction device 100 may select one of the candidates 951, 952, and 953 of the decoding parameter, based on the machine learning model. The audio reconstruction device 100 may include at least one of the data learner 410 and the data applier 420. The audio reconstruction device 100 may select one of the decoding parameters by applying at least one of decoding parameters of a current frame and decoding parameters of a previous frame to the machine learning model. The machine learning model may be pre-trained.

The decoding parameters may include a first parameter and a second parameter. The audio reconstruction device 100 may use the first parameter associated with the second parameter, to select one of candidates of the second parameter.

Referring to a graph 960, the audio reconstruction device 100 may obtain a selected decoding parameter 961. The audio reconstruction device 100 may obtain an audio signal decoded based on the selected decoding parameter 961.

Referring to a graph 970, the audio reconstruction device 100 may additionally use two bits to represent a decoding parameter. The audio reconstruction device 100 may determine candidates 971,972, 973, 974, and 975 corresponding to a decoding parameter 931 of the graph 930. The candidates 971,972, 973, 974, and 975 have more detailed values compared to the candidates 951, 952, and 953 of the graph 950. The audio reconstruction device 100 may reconstruct a more accurate decoding parameter by using two bits compared to a case when one bit is used. The audio reconstruction device 100 may use characteristics of the decoding parameter to determine the candidates 971,972, 973, 974, and 975 of the decoding parameter. For example, the characteristics of the decoding parameter may include a range 976 of the decoding parameter. The candidates 971,972, 973, 974, and 975 may be within the range 976 of the decoding parameter.

The audio reconstruction device 100 may select one of the candidates 971,972, 973, 974, and 975 of the decoding parameter, based on the machine learning model. The audio reconstruction device 100 may select one of the decoding parameters by applying at least one of decoding parameters of a current frame and decoding parameters of a previous frame to the machine learning model. The decoding parameters may include a first parameter and a second parameter. The audio reconstruction device 100 may use the first parameter associated with the second parameter, to select one of candidates of the second parameter.

Referring to a graph 980, the audio reconstruction device 100 may obtain a selected decoding parameter 981. The selected decoding parameter 981 may have a more accurate value compared to the selected decoding parameter 961 of the graph 960. That is, the selected decoding parameter 981 may be closer to the original audio signal compared to the selected decoding parameter 961. The audio reconstruction device 100 may obtain an audio signal decoded based on the selected decoding parameter 981.

Figure 11:
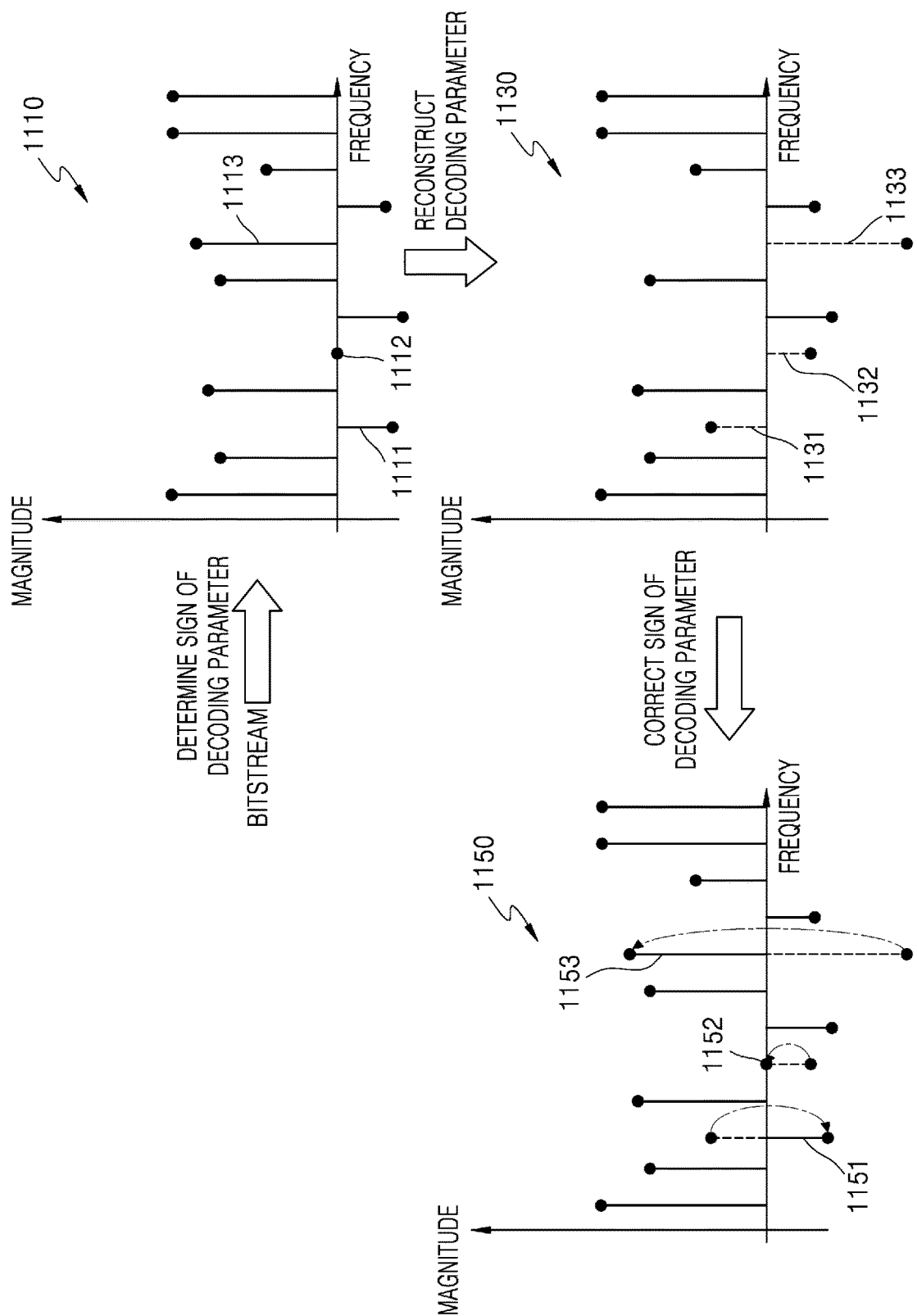
FIG. 11 shows changes in decoding parameters, according to an embodiment.

FIG. 11 shows changes in decoding parameters, according to an embodiment.

The audio reconstruction device 100 may receive a bitstream. The audio reconstruction device 100 may obtain decoding parameters, based on the bitstream. The audio reconstruction device 100 may determine characteristics of the decoding parameters. The characteristics of the decoding parameters may include signs. When a decoding parameter has a magnitude of 0, the magnitude of 0 may serve as characteristics of the decoding parameter.

For example, the decoding parameters may be spectral data. The spectral data may indicate signs of spectral bins. The spectral data may indicate whether the spectral bins have a value 0 or not. The spectral data may be included in the bitstream. The audio reconstruction device 100 may generate the spectral data, based on the bitstream.

The decoding parameters may include a first parameter and a second parameter. The audio reconstruction device 100 may determine characteristics of the second parameter, based on the first parameter. The first parameter may be spectral data. The second parameter may be a spectral bin.

A graph 1110 shows magnitudes of the decoding parameters according to frequencies. The decoding parameters may be spectral bins. The decoding parameters may have various signs. For example, a decoding parameter 1111 may have a negative sign. A decoding parameter 1113 may have a positive sign. The audio reconstruction device 100 may determine the signs of the decoding parameters 1111 and 1113 as characteristics of the decoding parameters 1111 and 1113. A decoding parameter 1112 may have a magnitude of 0. The audio reconstruction device 100 may determine the magnitude of 0 as characteristics of the decoding parameter 1112.

According to an embodiment of the disclosure, the audio reconstruction device 100 may determine reconstructed decoding parameters by applying the decoding parameters to a machine learning model. A graph 1130 shows magnitudes of the reconstructed decoding parameters according to frequencies. The audio reconstruction device 100 may obtain reconstructed decoding parameters 1131, 1132, and 1133 by reconstructing the decoding parameters 1111, 1112, and 1113. However, the reconstructed decoding parameters 1131 and 1133 may have signs different from those of the decoding parameters 1111 and 1113. The reconstructed decoding parameter 1132 may have a non-zero value unlike the decoding parameter 1112.

The audio reconstruction device 100 may obtain corrected decoding parameters by correcting the reconstructed decoding parameters, based on the characteristics of the decoding parameters. The audio reconstruction device 100 may correct the reconstructed decoding parameters, based on the signs of the decoding parameters. Referring to a graph 1150, the audio reconstruction device 100 may obtain corrected decoding parameters 1151 and 1153 by correcting the signs of the reconstructed decoding parameters 1131 and 1133. The audio reconstruction device 100 may obtain a corrected decoding parameter 1152 by correcting the magnitude of the reconstructed decoding parameter 1132 to 0.

According to another embodiment of the disclosure, the audio reconstruction device 100 may obtain the reconstructed decoding parameters by applying the machine learning model to the decoding parameters and the characteristics of the decoding parameters. That is, the audio reconstruction device 100 may obtain the reconstructed parameters shown in the graph 1150, based on the decoding parameters shown in the graph 1110.

Figure 12:
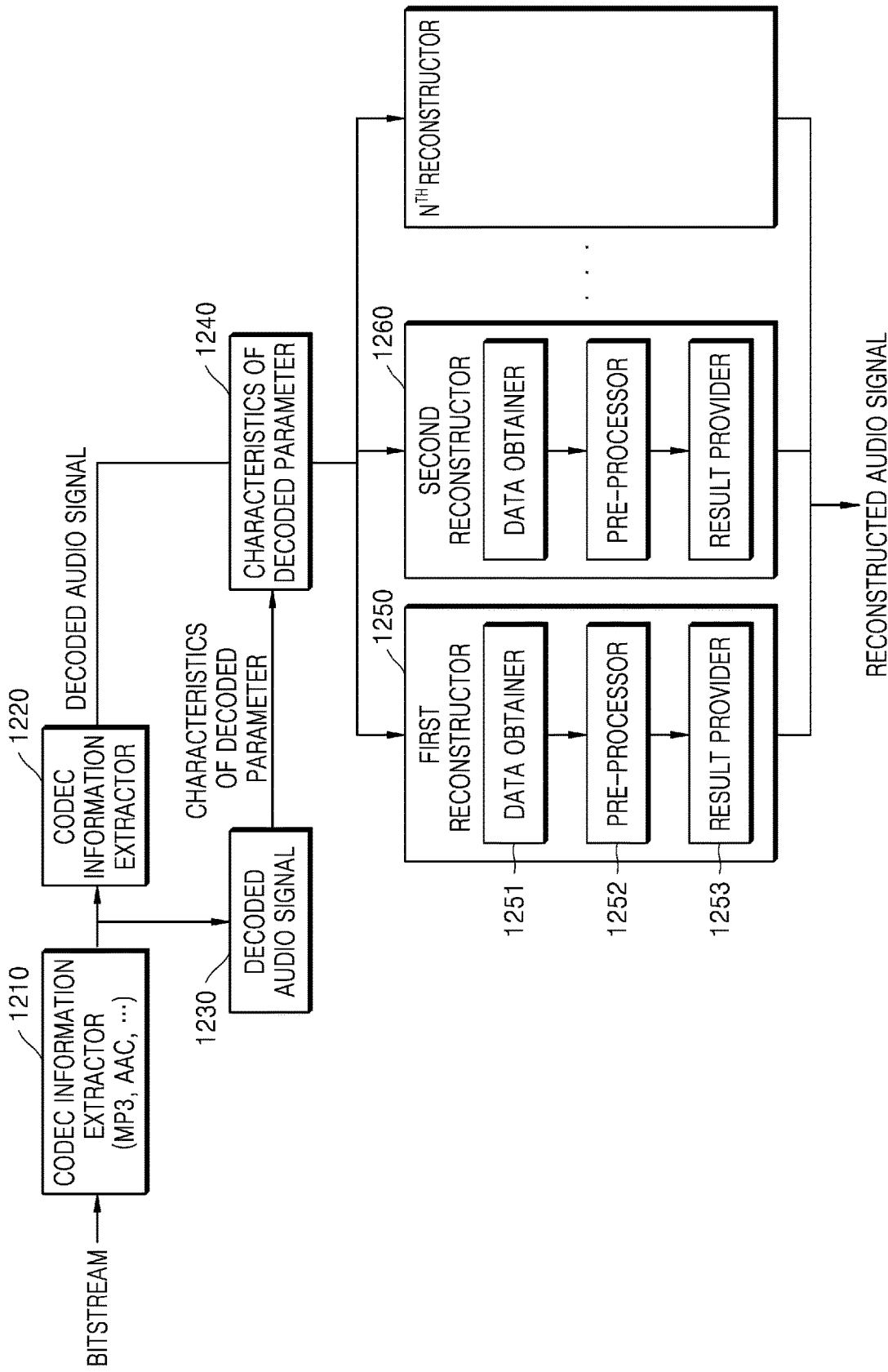
FIG. 12 is a block diagram of the audio reconstruction device according to an embodiment.

FIG. 12 is a block diagram of the audio reconstruction device 100 according to an embodiment.

The audio reconstruction device 100 may include a codec information extractor 1210, an audio signal decoder 1220, a bitstream analyzer 1230, a reconstruction method selector 1240, and at least one reconstructor.

The codec information extractor 1210 may equally correspond to the receiver 110 of FIG. 1. The codec information extractor 1210 may equally correspond to the codec information extractor 210 of FIG. 2. The codec information extractor 1210 may receive a bitstream and determine a technique used to encode the bitstream. The technique used to encode original audio may include, for example, an MP3, AAC, or HE-AAC technique.

The audio signal decoder 1220 decodes an audio signal, based on the bitstream. The audio signal decoder 1220 may equally correspond to the audio signal decoder 230 of FIG. 2. The audio signal decoder 1220 may include a lossless decoder, an inverse quantizer, a stereo signal reconstructor, and an inverse converter. The audio signal decoder 1220 may output a reconstructed audio signal, based on codec information received from the codec information extractor 1210.

The bitstream analyzer 1230 may obtain decoding parameters of a current frame, based on the bitstream. The bitstream analyzer 1230 may check characteristics of the reconstructed audio signal, based on the decoding parameters. The bitstream analyzer 1230 may transmit information about signal characteristics to the reconstruction method selector 1240.

For example, the decoding parameters may include at least one of spectral bins, a scale factor gain, a global gain, a window type, a buffer level, temporal noise shaping (TNS) information, and perceptual noise substitution (PNS) information.

The spectral bins may correspond to signal magnitudes according to frequencies in the frequency domain. An audio encoding device may transmit accurate spectral bins only for a human-sensitive frequency range to reduce data. The audio encoding device may transmit no spectral bins or inaccurate spectral bins for a high-frequency or low-frequency region inaudible to humans. The audio reconstruction device 100 may apply a bandwidth extension technique to a region for which spectral bins are not transmitted. The bitstream analyzer 1230 may determine a frequency region for which spectral bins are accurately transmitted and a frequency region for which spectral bins are inaccurately transmitted, by analyzing the spectral bins. The bitstream analyzer 1230 may transmit information about frequencies to the reconstruction method selector 1240.

For example, the bandwidth extension technique may be generally applied to a high-frequency region. The bitstream analyzer 1230 may determine a minimum frequency value of the frequency region for which spectral bins are inaccurately transmitted, as a start frequency. The bitstream analyzer 1230 may determine that the bandwidth extension technique needs to be applied from the start frequency. The bitstream analyzer 1230 may transmit information about the start frequency to the reconstruction method selector 1240.

The scale factor gain and the global gain are values for scaling the spectral bins. The bitstream analyzer 1230 may obtain the characteristics of the reconstructed audio signal by analyzing the scale factor gain and the global gain. For example, when the scale factor gain and the global gain of the current frame rapidly change, the bitstream analyzer 1230 may determine that the current frame is a transient signal. When the scale factor gain and the global gain of frames hardly change, the bitstream analyzer 1230 may determine that the frames are stationary signals. The bitstream analyzer 1230 may transmit information indicating whether frames are stationary signals or transient signals, to the reconstruction method selector 1240.

The window type may correspond to a time period for converting the original audio signal of the time domain to the frequency domain. When the window type of the current frame indicates "long", the bitstream analyzer 1230 may determine that the current frame is a stationary signal. When the window type of the current frame indicates "short", the bitstream analyzer 1230 may determine that the current frame is a transient signal. The bitstream analyzer 1230 may transmit information indicating whether frames are stationary signals or transient signals, to the reconstruction method selector 1240.

The buffer level is information about the number of available bits remaining after a frame is encoded. The buffer level is used to encode data by using a variable bit rate (VBR). When a frame of the original audio is a stationary signal that rarely changes, the audio encoding device may encode the original audio by using a small number of bits. However, when a frame of the original audio is a transient signal that greatly changes, the audio encoding device may encode the original audio by using a large number of bits. The audio encoding device may use available bits remaining after a stationary signal is encoded, to encode a transient signal. That is, a high buffer level of the current frame means that the current frame is a stationary signal. A low buffer level of the current frame means that the current frame is a transient signal. The bitstream analyzer 1230 may transmit information indicating whether frames are stationary signals or transient signals, to the reconstruction method selector 1240.

The TNS information is information for reducing pre-echo. A start location of an attack signal in the time domain may be found based on the TNS information. The attack signal refers to sudden loud sound. Because the start location of the attack signal may be found based on the TNS information, the bitstream analyzer 1230 may determine that a signal before the start location is a stationary signal. The bitstream analyzer 1230 may determine that a signal after the start location is a transient signal.

The PNS information is information about a part where a hole occurs in the frequency domain. The hole refers to a part for which spectral bins are not transmitted to save bits of the bitstream and which is filled with arbitrary noise in a decoding procedure. The bitstream analyzer 1230 may transmit information about a location of the hole to the reconstruction method selector 1240.

The reconstruction method selector 1240 may receive the decoded audio signal and the characteristics of the decoded parameters. The reconstruction method selector 1240 may select a method of reconstructing the decoded audio signal. The decoded audio signal may be reconstructed by one of the at least one reconstructor, based on the selection of the reconstruction method selector 1240.

The at least one reconstructor may include, for example, a first reconstructor 1250, a second reconstructor 1260, and an $N^{th}$ reconstructor. At least one of the first reconstructor 1250, the second reconstructor 1260, and the $N^{th}$ reconstructor may use a machine learning model. The machine learning model may be a model generated by machine-learning at least one of the original audio signal, the decoded audio signal, and the decoding parameters. At least one of the first reconstructor 1250, the second reconstructor 1260, and the $N^{th}$ reconstructor may include a data obtainer 1251, a pre-processor 1252, and a result provider 1253. At least one of the first reconstructor 1250, the second reconstructor 1260, and the $N^{th}$ reconstructor may include the data learner 410 of FIG. 4. At least one of the first reconstructor 1250, the second reconstructor 1260, and the $N^{th}$ reconstructor may receive at least one of the decoded audio signal and the decoding parameters as input.

According to an embodiment of the disclosure, the characteristics of the decoded parameters may include the information about a frequency region for which spectral bins are accurately transmitted and a frequency region for which spectral bins are inaccurately transmitted. For a frequency region of the current frame for which spectral bins are accurately transmitted, the reconstruction method selector 1240 may determine to reconstruct the decoded audio signal, based on at least one of the decoded parameters and the decoded audio signal. The reconstruction method selector 1240 may determine to reconstruct the decoded audio signal by using the first reconstructor 1250. The first reconstructor 1250 may output a reconstructed audio signal by using the machine learning model.

For a frequency region of the current frame for which spectral bins are not accurately transmitted, the reconstruction method selector 1240 may determine to reconstruct the audio signal by using a bandwidth extension technique. The bandwidth extension technique includes spectral band replication (SBR). The reconstruction method selector 1240 may determine to reconstruct the decoded audio signal by using the second reconstructor 1260. The second reconstructor 1260 may output a reconstructed audio signal by using a bandwidth extension technique improved by the machine learning model.

According to another embodiment of the disclosure, the characteristics of the decoded parameters may include the information indicating whether a frame is a stationary signal or a transient signal. When the frame is a stationary signal, the reconstruction method selector 1240 may use the first reconstructor 1250 for the stationary signal. When the frame is a transient signal, the reconstruction method selector 1240 may use the second reconstructor 1260 for the transient signal. The first or second reconstructor 1250 or 1260 may output the reconstructed audio signal.

According to another embodiment of the disclosure, the characteristics of the decoded parameters may include the information about a location of a hole. For an audio signal decoded using signals not corresponding to locations of holes, the reconstruction method selector 1240 may determine to reconstruct the decoded audio signal, based on the decoded parameters and the decoded audio signal. The reconstruction method selector 1240 may determine to reconstruct the decoded audio signal by using the first reconstructor 1250. The first reconstructor 1250 may output a reconstructed audio signal by using the machine learning model. For an audio signal decoded using signals corresponding to locations of holes, the reconstruction method selector 1240 may use the second reconstructor 1260 for signals corresponding to locations of holes. The second reconstructor 1260 may output a reconstructed audio signal by using the machine learning model.

Because the method of reconstructing the decoded audio signal may be selected based on the characteristics of the audio signal by the reconstruction method selector 1240, the audio reconstruction device 100 may efficiently reconstruct the audio signal.

Figure 13:
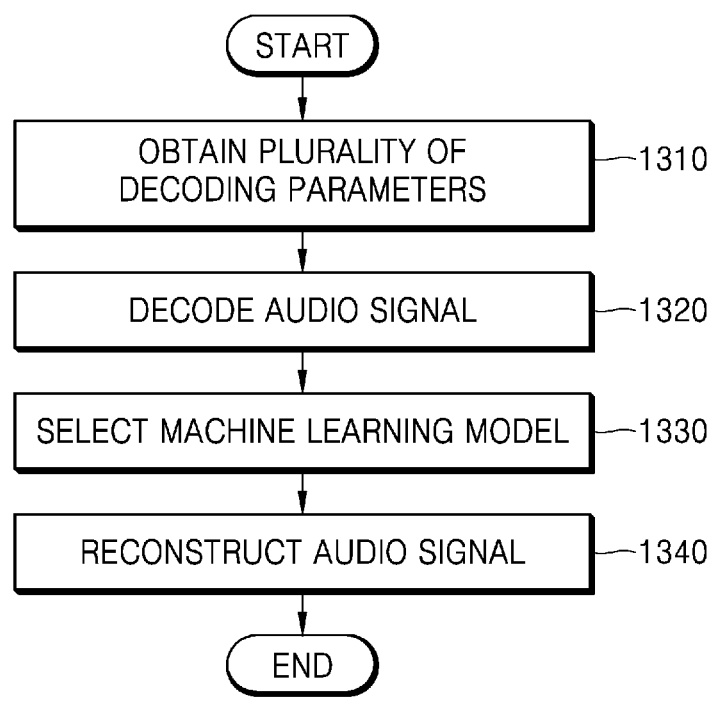
FIG. 13 is a flowchart of an audio reconstruction method according to an embodiment.

FIG. 13 is a flowchart of an audio reconstruction method according to an embodiment.

In operation 1310, the audio reconstruction device 100 obtains a plurality of decoding parameters of a current frame by decoding a bitstream. In operation 1320, the audio reconstruction device 100 decodes an audio signal, based on the plurality of decoding parameters. In operation 1330, the audio reconstruction device 100 selects a machine learning model from among a plurality of machine learning models, based on the decoded audio signal and at least one of the plurality of decoding parameters. In operation 1340, the audio reconstruction device 100 reconstructs the decoded audio signal by using the selected machine learning model.

Both of the audio reconstruction device 100 based on FIG. 13 and the audio reconstruction device 100 based on FIG. 3 may improve the quality of a decoded audio signal. The audio reconstruction device 100 based on FIG. 13 is less dependent on decoding parameters and thus may achieve a higher versatility.

Operation of the audio reconstruction device 100 will now be described in detail with reference to FIGS. 14 and 15.

Figure 14:
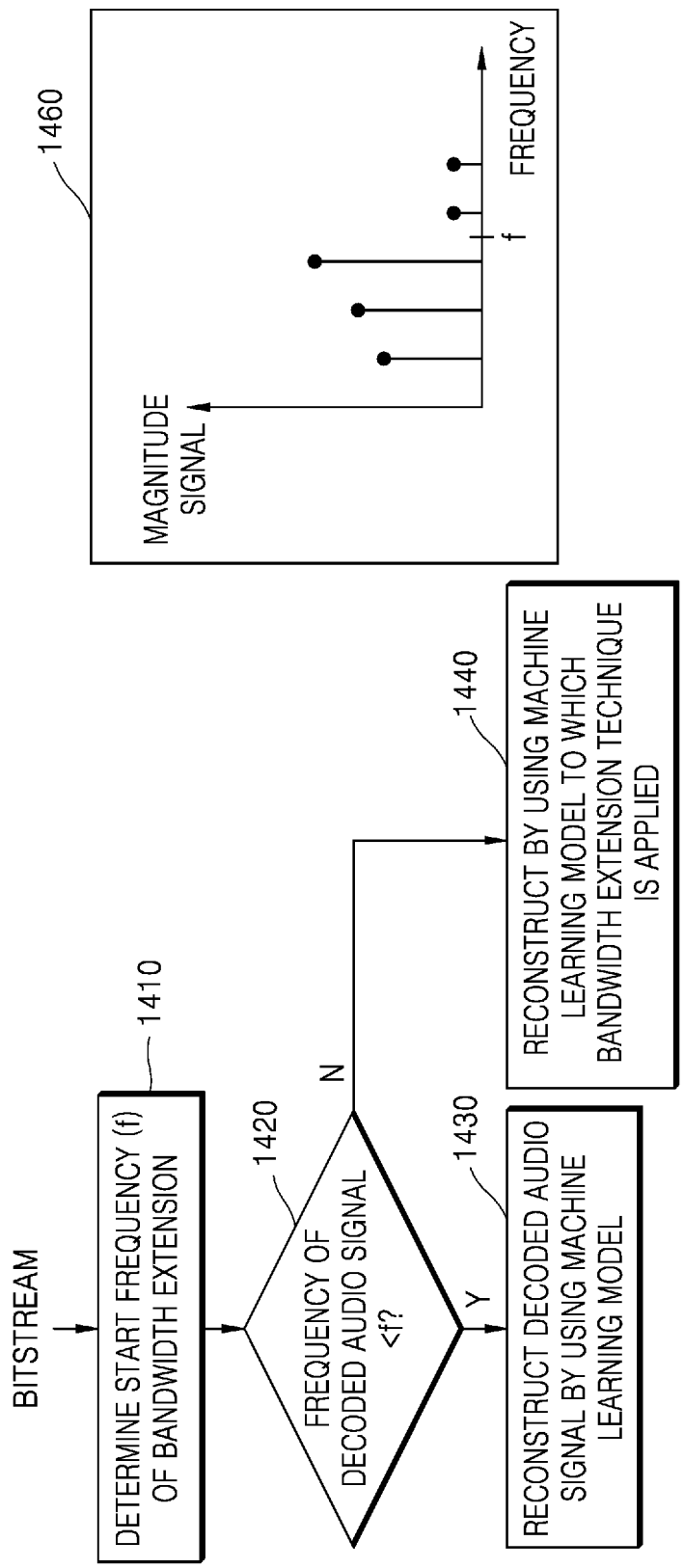
FIG. 14 is a flowchart of an audio reconstruction method according to an embodiment.

FIG. 14 is a flowchart of an audio reconstruction method according to an embodiment.

The codec information extractor 1210 may receive a bitstream. The audio signal decoder 1220 may output an audio signal decoded based on the bitstream.

The bitstream analyzer 1230 may obtain characteristics of decoding parameters, based on the bitstream. For example, the bitstream analyzer 1230 may determine a start frequency of a bandwidth extension, based on at least one of a plurality of decoding parameters (operation 1410).

Referring to a graph 1460, an audio encoding device may accurately transmit spectral bins for a frequency region lower than a frequency f. However, for a frequency region higher than the frequency f and inaudible to humans, the audio encoding device may not transmit or poorly transmit spectral bins. The codec information extractor 1210 may determine a start frequency f of a bandwidth extension, based on the spectral bins. The codec information extractor 1210 may output information about the start frequency f of the bandwidth extension to the reconstruction method selector 1240.

The reconstruction method selector 1240 may select a machine learning model of the decoded audio signal, based on the start frequency f and a frequency of the decoded audio signal. The reconstruction method selector 1240 may compare the frequency of the decoded audio signal to the start frequency f (operation 1420). The reconstruction method selector 1240 may select a reconstruction method, based on the comparison.

When the frequency of the decoded audio signal is lower than the start frequency f, the reconstruction method selector 1240 may select a certain machine learning model. The certain machine learning model may be pre-trained based on the decoded audio signal and an original audio signal. The audio reconstruction device 100 may reconstruct the decoded audio signal by using the machine learning model (operation 1430).

When the frequency of the decoded audio signal is higher than the start frequency f, the reconstruction method selector 1240 may reconstruct the decoded audio signal by using a bandwidth extension technique. For example, the reconstruction method selector 1240 may select a machine learning model to which the bandwidth extension technique is applied. The machine learning model may be pre-trained using at least one of a parameter related to the bandwidth extension technique, the decoded audio signal, and the original audio signal. The audio reconstruction device 100 may reconstruct the decoded audio signal by using the machine learning model to which the bandwidth extension technique is applied (operation 1440).

Figure 15:
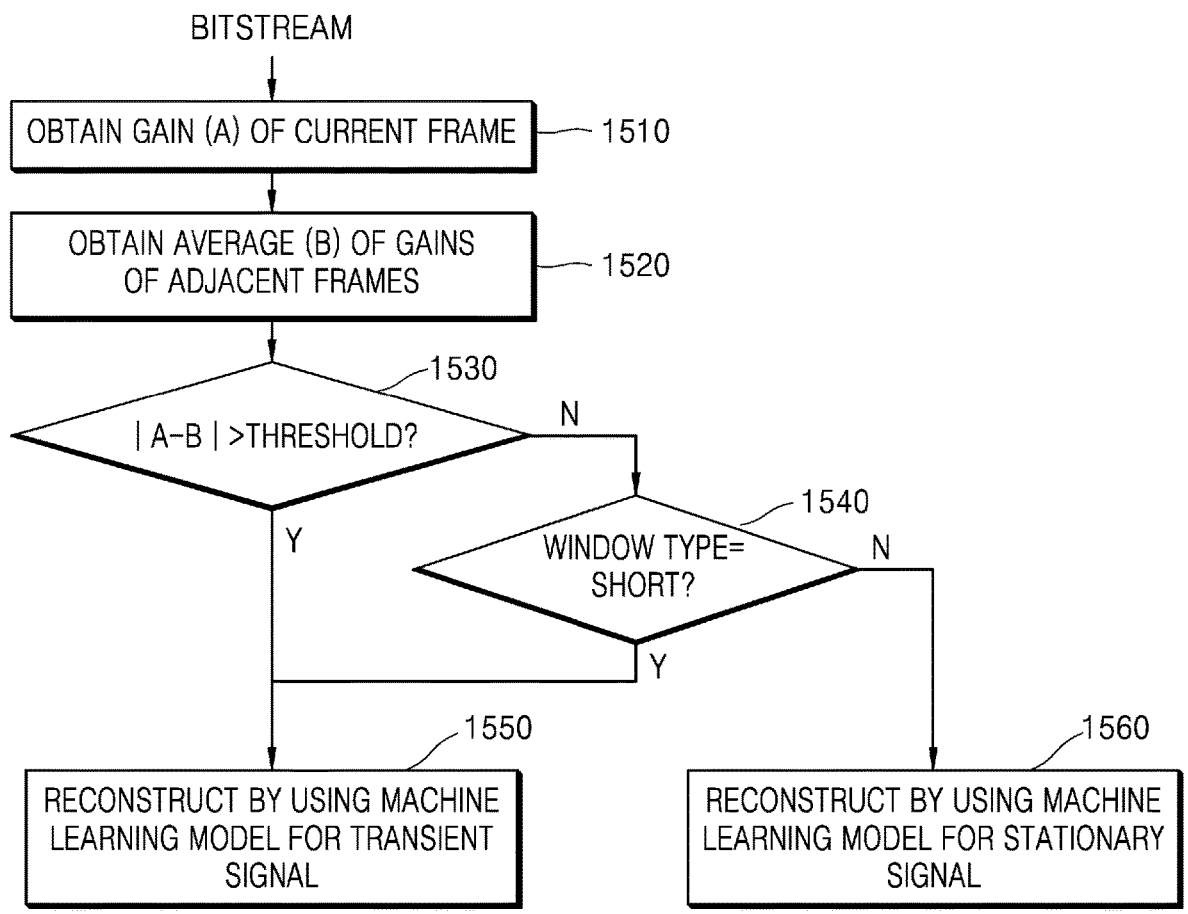
FIG. 15 is a flowchart of an audio reconstruction method according to an embodiment.

FIG. 15 is a flowchart of an audio reconstruction method according to an embodiment.

The codec information extractor 1210 may receive a bitstream. The audio signal decoder 1220 may output an audio signal decoded based on the bitstream.

The bitstream analyzer 1230 may obtain characteristics of decoding parameters, based on the bitstream. For example, the bitstream analyzer 1230 may obtain a gain A of a current frame, based on at least one of a plurality of decoding parameters (operation 1510). The bitstream analyzer 1230 may obtain an average of gains of the current frame and frames adjacent to the current frame (operation 1520).

The reconstruction method selector 1240 may compare a difference between the gain of the current frame and the average of the gains to a threshold (operation 1530). When the difference between the gain of the current frame and the average of the gains is greater than the threshold, the reconstruction method selector 1240 may select a machine learning model for a transient signal. The audio reconstruction device 100 may reconstruct the decoded audio signal by using the machine learning model for the transient signal (operation 1550).

When the difference between the gain of the current frame and the average of the gains is less than the threshold, the reconstruction method selector 1240 may determine whether a window type included in the plurality of decoding parameters indicates short (operation 1540). When the window type indicates short, the reconstruction method selector 1240 may select the machine learning model for the transient signal (operation 1550). When the window type does not indicate short, the reconstruction method selector 1240 may select a machine learning model for a stationary signal. The audio reconstruction device 100 may reconstruct the decoded audio signal by using the machine learning model for the stationary signal (operation 1560).

The machine learning model for the transient signal may be machine-learned based on the original audio signal and the decoded audio signal, which are classified into transient signals. The machine learning model for the stationary signal may be machine-learned based on the original audio signal and the decoded audio signal, which are classified into stationary signals. Because the stationary and transient signals have different characteristics and the audio reconstruction device 100 separately machine-learns the stationary and transient signals, the decoded audio signal may be efficiently reconstructed.

The disclosure has been particularly shown and described with reference to various embodiments thereof. It will be understood by one of ordinary skill in the art that various changes in form and details may be made therein without departing from the scope of the disclosure. Therefore, the afore-described embodiments should be considered in a descriptive sense only and not for purposes of limitation. The scope of the disclosure is defined not by the above description but by the appended claims, and all variations derived from the scope defined by the claims and their equivalents will be construed as being included in the scope of the disclosure.

The afore-described embodiments of the disclosure may be written as computer programs and be implemented in a general-purpose digital computer that executes the programs by using a computer-readable recording medium. Examples of the computer-readable recording medium include magnetic storage media (e.g., ROM, floppy disks, and hard disks) and optical recording media (e.g., CD-ROMs and DVDs).

The invention claimed is:

1. An audio reconstruction method comprising:
obtaining a plurality of decoding parameters of a current frame by decoding a bitstream;
determining characteristics of a second parameter comprised in the plurality of decoding parameters and associated with a first parameter, based on the first parameter comprised in the plurality of decoding parameters;
obtaining a reconstructed second parameter by applying a machine learning model to at least one of the plurality of decoding parameters, the second parameter, and the characteristics of the second parameter;
obtaining a corrected second parameter by correcting the reconstructed second parameter, based on the characteristics of the second parameter; and
decoding an audio signal, based on the corrected second parameter.

2. The audio reconstruction method of claim 1,
wherein the determining of the characteristics of the second parameter comprises determining a range of the second parameter based on the first parameter, and
wherein the obtaining of the corrected second parameter comprises, in response to the reconstructed second parameter not being within the range of the second parameter, obtaining a range value, which is closest to the reconstructed second parameter, as the corrected second parameter.

3. The audio reconstruction method of claim 1, wherein the determining of the characteristics of the second parameter comprises determining the characteristics of the second parameter by using a pre-trained machine learning model pre-trained based on at least one of the first or second parameters.

4. The audio reconstruction method of claim 1, wherein the obtaining of the reconstructed second parameter comprises:
determining candidates of the second parameter based on the characteristics of the second parameter; and
selecting one of the candidates of the second parameter based on the machine learning model.

5. The audio reconstruction method of claim 1, wherein the obtaining of the reconstructed second parameter comprises obtaining the reconstructed second parameter of the current frame based on at least one of a plurality of decoding parameters of a previous frame.

6. The audio reconstruction method of claim 1, wherein the machine learning model is generated by machine-learning an original audio signal and at least one of the plurality of decoding parameters.

7. The audio reconstruction method of claim 1, further comprising:
based on the decoded audio signal and at least one of the plurality of decoding parameters, selecting the machine learning model from among a plurality of machine learning models; and
reconstructing the decoded audio signal by using the selected machine learning model.

8. The audio reconstruction method of claim 7, wherein the selecting of the machine learning model comprises:
determining a start frequency of a bandwidth extension, based on at least one of the plurality of decoding parameters; and
selecting a machine learning model of the decoded audio signal, based on the start frequency and a frequency of the decoded audio signal.

9. The audio reconstruction method of claim 7, wherein the selecting of the machine learning model comprises:
obtaining a gain of a current frame, based on at least one of the plurality of decoding parameters;
obtaining an average of gains of the current frame and frames adjacent to the current frame;
selecting a machine learning model for a transient signal when a difference between the gain of the current frame and the average of the gains is greater than a threshold;

determining whether a window type comprised in the plurality of decoding parameters indicates short, when the difference between the gain of the current frame and the average of the gains is less than the threshold;

selecting the machine learning model for the transient signal when the window type indicates short; and selecting a machine learning model for a stationary signal when the window type does not indicate short.

10. A non-transitory computer-readable recording medium having recorded thereon a computer program for executing the method of claim 1.

11. An audio reconstruction device comprising:

a memory storing a received bitstream; and at least one processor configured to:

obtain a plurality of decoding parameters of a current frame by decoding the bitstream, determine characteristics of a second parameter comprised in the plurality of decoding parameters and associated with a first parameter, based on the first parameter comprised in the plurality of decoding parameters, obtain a reconstructed second parameter by applying a machine learning model to at least one of the plurality of decoding parameters, the second parameter, and the characteristics of the second parameter, obtain a corrected second parameter by correcting the reconstructed second parameter, based on the characteristics of the second parameter, and decode an audio signal, based on the corrected second parameter.

12. The audio reconstruction device of claim 11, wherein the at least one processor is further configured to determine the characteristics of the second parameter by using a pre-trained machine learning model pre-trained based on at least one of the first or second parameters.

13. The audio reconstruction device of claim 11, wherein the at least one processor is further configured to:

obtain the reconstructed second parameter by determining candidates of the second parameter based on the characteristics of the second parameter, and select one of the candidates of the second parameter based on the machine learning model.

14. The audio reconstruction device of claim 11, wherein the at least one processor is further configured to obtain the reconstructed second parameter of the current frame based on at least one of a plurality of decoding parameters of a previous frame.

15. The audio reconstruction device of claim 11, wherein the machine learning model is generated by machine-learning an original audio signal and at least one of the plurality of decoding parameters.

16. The audio reconstruction device of claim 11, wherein the at least one processor is further configured to:

based on the decoded audio signal and at least one of the plurality of decoding parameters, select a first machine learning model from among a plurality of machine learning models, and reconstruct the decoded audio signal by using the first machine learning model.

* * * * *